United States Patent

Nakatoh et al.

[11] Patent Number: 5,611,019
[45] Date of Patent: Mar. 11, 1997

[54] METHOD AND AN APPARATUS FOR SPEECH DETECTION FOR DETERMINING WHETHER AN INPUT SIGNAL IS SPEECH OR NONSPEECH

[75] Inventors: Yoshihisa Nakatoh, Neyagawa; Takeshi Norimatsu, Kadoma, both of Japan

[73] Assignee: Matsushita Electric Industrial Co., Ltd., Osaka, Japan

[21] Appl. No.: 246,346

[22] Filed: May 19, 1994

[30] Foreign Application Priority Data

May 19, 1993 [JP] Japan ................................. 5-116980

[51] Int. Cl.$^6$ .......................................................... G10L 5/06
[52] U.S. Cl. ...................... 395/2.42; 395/2.49; 395/2.63; 395/2.52
[58] Field of Search ................................... 395/2.4, 2.42, 395/2.45, 2.47–2.49, 2.52, 2.63; 381/41, 43, 46, 47

[56] References Cited

U.S. PATENT DOCUMENTS

| | | | |
|---|---|---|---|
| 4,284,846 | 8/1981 | Marley | 395/2.62 |
| 4,736,429 | 4/1988 | Niyada et al. | 381/43 |
| 4,920,568 | 4/1990 | Kamiya et al. | 381/46 |
| 4,991,216 | 2/1991 | Fujii et al. | 381/41 |
| 5,131,043 | 7/1992 | Fujii et al. | 381/43 |
| 5,220,610 | 6/1993 | Kane et al. | 381/46 |

FOREIGN PATENT DOCUMENTS

| | | | |
|---|---|---|---|
| 286035 | 10/1988 | European Pat. Off. | G10L 5/06 |
| 302663 | 2/1989 | European Pat. Off. | G10L 5/06 |
| 0335521 | 10/1989 | European Pat. Off. . | |
| 0459384 | 12/1991 | European Pat. Off. . | |
| 1-277899 | 11/1989 | Japan | G10L 3/00 |

OTHER PUBLICATIONS

H. Kobatake et al., "Speech/Nonspeech Discrimination for Speech Recognition System under Real Life Noise Environments", IEEE International Conference on Acoustics, Speech & Signal Processing, vol. 1, pp. 365–368 (1989).
EPO Search Report dated Jan. 9, 1996.
European Search Report dated Sept. 9, 1996.
H. Kobatake, et al., "Speech/Nonspeech Discrimination for Speech Recognition System Under Real Life Noise Environments", *ICASSP*. 89, vol. 1, pp. 365–368 (1989).
B. S. Atal et al., "A Pattern Recognition Approach to Voiced–Unvoiced–Silence Classification with Applications to Speech Recognition", *IEEE Transactions on Acoustics, Speech, and Signal Processing*, vol. ASSP–24, No. 3, pp. 201–212 (Jun. 1976).

*Primary Examiner*—Kee M. Tung
*Attorney, Agent, or Firm*—Ratner & Prestia

[57] ABSTRACT

The speech detection apparatus comprises: a reference model maker for extracting a plurality of parameters for a speech detection from training data, and for making a reference model based on the parameters; a parameter extractor for extracting the plurality of parameters from each frame of an input audio signal; and a decision device for deciding whether or not the audio signal is speech, by comparing the parameters extracted from the input audio signal with the reference model. The reference model maker makes the reference model for each phoneme. The decision devices includes: a similarity computing unit for comparing the parameters extracted from each frame of the input audio signal with the reference model, and for computing a similarity of the frame with respect to the reference model; a phoneme decision unit for deciding a phoneme of each frame of the input audio signal based on the similarity computed for each phoneme; and a final decision unit for deciding whether or not a specific period of the input audio signal including a plurality of frames is speech, based on the result of the phoneme decision for the plurality of frames.

56 Claims, 24 Drawing Sheets

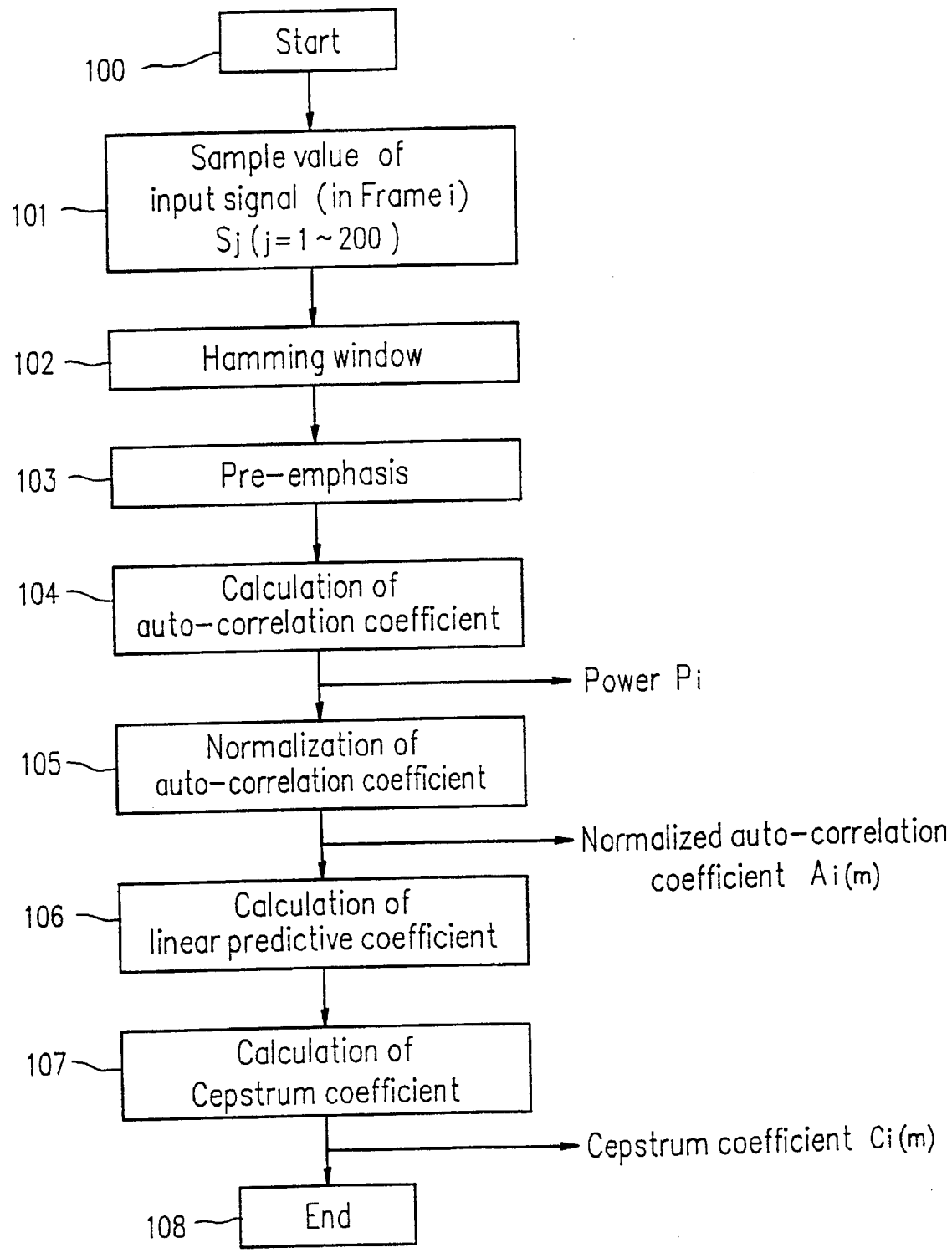

METHOD AND AN APPARATUS FOR SPEECH DETECTION FOR DETERMINING WHETHER AN INPUT SIGNAL IS SPEECH OR NONSPEECH

BACKGROUND OF THE INVENTION

1. Field of the Invention

The present invention relates to a speech detection apparatus for deciding whether an input signal is speech or nonspeech, under a noisy condition in a real life environment which includes speech with various stationary and/or nonstationary noises. More particularly, the present invention relates to a speech detection method and a speech detection apparatus, used for detecting speech period, in a video conference system, an audio reproduction system of television or audio equipment, a speech recognition device or the like.

2. Description of the Related Art

Recently, digital signal processing techniques have been widely used in various fields of electrical equipment. For example, in the field of data transmission equipment, a technique and a device for transmitting image data, as well as speech data, whereby performing a communication with a sense of presence are now under development. Videophone and video conference systems are typical examples of applications of such techniques, wherein a TV screen plays an important role. Especially, a video conference system in which many people may have conversations requires a technique for correctly responding to the voice of a speaker and properly changing the TV screen so as to display the current speaker.

Furthermore, in the audio reproduction system of a television or audio equipment, techniques are under development for adding a reverberation and/or a reflection to a reproduced sound so that a listener may enjoy a sense of presence. When a broad-band signal or a stereo signal of musical sound or the like is reproduced, artificial sounds such as a reverberation sound or a reflection sound may added to the signal so as to result in a desirable effect. However, when a speech signal or a monaural signal is reproduced, these artificial sounds do not necessarily get an intended effect. In some cases, an articulation score of the signal may be degraded. Accordingly, in order to perform an effective audio reproduction by adding the artificial sounds only to nonspeech signals such as a music signal, it is necessary to determine whether the input audio signal is a speech signal or a nonspeech signal.

Moreover, in the system for performing a speech recognition or the like, in a case where a noise which is not speech is input and erroneously judged as speech, it may cause an erroneous recognition. Accordingly, such a system requires a speech detection apparatus capable of correctly deciding whether an input signal is a speech signal or not.

The speech detection is performed mainly based on a power of the input signal; a portion having a power value larger than a predetermined threshold value is judged as a speech signal. This method is quite commonly used, due to the simplicity of processing. However, in a real life environment with various noises, a nonspeech sound having a power larger than the threshold may be input with a high probability. Accordingly, the speech detection based on a single feature of the power may often result in an erroneous decision.

Several methods have been proposed for making a decision whether the input signal is speech or non-speech, by using a plurality of parameters (characteristic quantities) indicative of speech properties besides the power. Such a method is described, e.g., in H. Kobatake, K. Tawa, A. Ishisda, "Speech/Nonspeech Discrimination for Speech Recognition System Under Real Life Noise Environments" Proc. ICASSP, 89, 365–368 (1989). For speech/nonspeech discrimination in a real life environment, this method uses acoustic parameters effective for discriminating between speech sounds and various nonstationary noises which occur at a laboratory or an office in daily life. Specifically, this speech/nonspeech discrimination is performed by using a portion considered to be a vowel in a large-powered part of a speech signal, based on the occupation ratio of the vowel portions to the large-powered part of the speech signal. In speech/nonspeech discrimination, five audio parameters are adopted, i.e., periodicity, pitch frequency, optimum order of linear prediction, distance between five vowels and sharpness of formants. An upper or lower threshold value is set for each of the parameters. Then, five parameters are derived from an input signal, and the speech/nonspeech discrimination is performed based on the relationship between the derived parameters and the set upper or lower threshold value. However, because of a very complicated computation process for deriving parameters and comparing each of them with the upper or lower threshold, this method is time-consuming and thus has disadvantages as a practical method. Furthermore this method is much affected by the variance of the parameter caused by the addition of a stationary noise or the like.

In addition, a method for voiced/unvoiced speech decision has been proposed, though it is not a method for speech/nonspeech (noise) discrimination. For example such a method is described in B. S. Atal, L. R. Rabiner, "A Pattern Recognition Approach to Voiced-unvoiced-silence classification with application to speech recognition", IEEE Trans Acoust., Speech Signal Processing, ASSP-24-3 (1976). In this method five parameters are used log energy of the signal, zero-crossing rate of the signal, autocorrelation coefficients at unit sample delay, first predictor coefficient and log energy of the prediction error. Normal distribution is assumed for each of the parameters and the voiced-unvoiced-silence discrimination is performed by using simultaneous probabilities. However, the discrimination is not correctly performed for stationary noises or noises whose energy predominates in the low-frequency region, although it is effective for noises whose energy predominates in the high-frequency region.

SUMMARY OF THE INVENTION

An apparatus for speech detection according to the present invention comprises: a reference model maker for extracting a plurality of parameters for a speech detection from training data, and making a reference model based on the parameters; a parameter extractor for extracting the plurality of parameters from each frame of an input audio signal; and a decision device for deciding whether the audio signal is speech or not, by comparing the parameters extracted from the input audio signal with the reference model. The reference model maker makes the reference model for each phonemes, and the decision device includes: a similarity computing unit for comparing the parameters extracted from each frame of the input audio signal with the reference model, and computing a similarity of the frame with respect to the reference model; a phoneme decision unit for deciding a phoneme of each frame of the input audio signal based on the similarity computed for each phoneme;

and a final decision unit for deciding whether a specific period of the input audio signal including a plurality of frames is speech or not based on the result of the phoneme decision.

In one embodiment of the invention, the reference model maker makes a reference pattern by calculating a mean value and a covariance matrix of the plurality of parameters for each phoneme.

In another embodiment of the invention, the plurality of parameters are selected from the group consisting of the first and higher order auto-correlation coefficients, the first and higher order PARCOR coefficients, the first and higher order melcepstrum coefficients, and the first and higher order LSP coefficients.

In still another embodiment of the invention, the parameter extractor includes an auto-correlation coefficient calculator for deriving auto-correlation coefficients of a plurality of orders and a cepstrum coefficient calculator for deriving cepstrum coefficients of a plurality of orders.

In still another embodiment of the invention, the auto-correlation coefficient calculator calculates the first and seventh auto-correlation coefficients, and the cepstrum coefficient calculator calculates the first and third cepstrum coefficients.

In still another embodiment of the invention, the similarity is a statistical distance between the parameters extracted from the input audio signal and interdigital transducer the reference model.

In still another embodiment of the invention, the statistical distance is a log likelihood.

In still another embodiment of the invention, the phoneme decision unit computes averaged likelihood by averaging the log likelihood of each frame computed by the likelihood computing unit with respect to a plurality of successive frames including a target frame for phoneme detection, and detect a phoneme based on the averaged likelihood.

In still another embodiment of the invention, the parameter extractor further includes a power calculator for computing a power for each frame, and wherein the specific period of the audio signal is a period having a power equal to or greater than a predetermined value.

In still another embodiment of the invention, the phoneme is a vowel, and the final decision unit comprises: a counting unit for counting the number of frames detected to be a vowel by the phoneme decision unit in the specific period; a computing unit for computing the ratio of the number counted by the counting unit to the number of the total frames included in the specific period; and a judging unit for deciding whether the specific period of the input signal is speech or not based on the ratio computed by the computing unit.

In still another embodiment of the invention, the phoneme is a consonant, and the final decision unit comprises: a counting unit for counting the number of frames detected to be a consonant by the phoneme decision unit in the specific period; a computing unit for computing the ratio of the number counted by the counting unit to the number of the total frames included in the specific period; and a judging unit for deciding whether the specific period of the input signal is speech or not based on the ratio computed by the computing unit.

In still another embodiment of the invention, the final decision unit includes: a classification unit for classifying the phonemes decided by the phoneme decision unit into first and second phoneme groups; a counting unit for counting a first number of frames classified into the first phoneme group and a second number of frames classified into the second phoneme group in the specific period of the input audio signal; a computing unit for computing a first ratio of the first number with respect to the number of frames included in the specific period and a second ratio of the second number with respect to the number of frames included in the specific period; and a judging unit for judging whether the specific period is speech or not using fuzzy reasoning based on the first ratio and the second ratio.

An apparatus for speech detection according to the present invention comprises: a reference model maker for extracting a plurality of parameters for a speech detection from training data, and making a reference model based on the parameters; a parameter extractor for extracting the plurality of parameters from each frame of an input audio signal; and a decision device for deciding whether the input audio signal is speech or not, by comparing the parameters extracted from the input audio signal with the reference model. The reference model maker includes parameter distribution maker for making a statistical distribution of the parameters for each phoneme, and a duration distribution maker for making a statistical distribution of the duration for each phoneme. The decision device includes: a first likelihood computing unit for calculating parameter likelihood for each frame by comparing the parameters extracted from the frame of the input audio signal with the parameter distribution; a second likelihood computing unit for deciding a phoneme candidate for each frame of the input audio signal based on the parameter likelihood of each frame, comparing a duration of the phoneme candidate with the duration distribution, and calculating duration likelihood for each frame; and a comprehensive decision unit for identifying one phoneme from the phoneme candidates based on the parameter likelihood and the duration likelihood, and for deciding whether a specific period containing a plurality of frames of the input audio signal is speech or not.

In one embodiment of the invention, the parameter distribution maker makes a reference pattern by calculating a mean value and a covariance matrix of the plurality of parameters for each phoneme, and the duration distribution maker makes a reference pattern by calculating a mean value and a covariance of the duration for each phoneme.

In another embodiment of the invention, the plurality of parameters are selected from the group consisting of the first and higher order auto-correlation coefficients, the first and higher order LPC coefficients, the first and higher order PARCOR coefficients, the first and higher order cepstrum coefficients, the first and higher order melcepstrum coefficients and the first and higher order LSP coefficients.

In still another embodiment of the invention, the parameter extractor has an auto-correlation coefficient calculator for extracting auto-correlation coefficients of a plurality of orders, and a cepstrum coefficient calculator for extracting cepstrum coefficients of a plurality of orders.

In still another embodiment of the invention, the auto-correlation coefficient calculator calculates the first and seventh auto-correlation coefficients, and the cepstrum coefficient calculator calculates the first and third cepstrum coefficients.

In still another embodiment of the invention,each of the parameter likelihood and the duration likelihood is a log likelihood.

In still another embodiment of the invention,the second likelihood computing unit calculates averaged likelihood by averaging the parameter likelihood for each frame with respect to a plurality of successive frames including a target frame for phoneme detection, and detects a phoneme candidate based on the averaged likelihood.

In still another embodiment of the invention, the parameter extractor further includes a power calculator for computing a power for each frame, and wherein the specific period of the audio signal is a period having a power greater than a predetermined value.

In still another embodiment of the invention, the comprehensive decision unit includes: a calculator for calculating synthetic likelihood based on the parameter likelihood and the duration likelihood; an identification unit for identifying one phoneme from the phoneme candidates based on the synthetic likelihood; a counting unit for counting a number of frames identified to be a phoneme in the specific period of the input audio signal; a calculator for calculating a ratio of the counted number of the frames with respect to the number of total frames included in the specific period of the input audio signal; and a judging unit for deciding whether the specific period of the input audio signal is speech or not base on the calculated ratio.

In still another embodiment of the invention, the comprehensive decision unit further includes: a classification unit for classifying the identified phoneme frames into first and second phoneme groups; a counting unit for counting a first number of frames classified into the first phoneme group and a second number of frames classified into the second phoneme group in the specific period of the input audio signal; a computing unit for computing a first ratio of the first number with respect to the number of frames included in the specific period and a second ratio of the second number with respect to the number of frames included in the specific period; and a judging unit for judging whether the specific period is speech or not using fuzzy reasoning based on the first ratio and the second ratio.

According to another aspect of the present invention, the speech detection apparatus comprises: a reference model maker for extracting a plurality of parameters for a speech detection from training data, and making a reference model based on the parameters; a parameter extractor for extracting the plurality of parameters from each frame of an input audio signal; and a decision device for deciding whether the input audio signal is speech or not, by comparing the parameters extracted from the input audio signal with the reference model. The reference model has a predetermined threshold value of each parameter for each phoneme, and the decision device includes: a first decision unit for deciding whether a frame of the input audio signal is speech or not by comparing the parameters extracted from the frame with the respective threshold values of the reference model; a second decision unit for deciding whether the frame which has been decided to be nonspeech by the first decision unit is speech or not, by comparing at least one parameter of the frame with the respective threshold value of the reference model; and a final decision unit for deciding whether the specific period of the input audio signal is speech or not based on the ratio of the number of frames which are decided to be speech by the first or second decision unit in the specific period with respect to the total number of frames in the specific period.

In one embodiment of the invention, the plurality of parameters are selected from the group consisting of the first and higher order auto-correlation coefficients, the first and higher order LPC coefficients, the first and higher order PARCOR coefficients, the first and higher order cepstrum coefficients, the first and higher order melcepstrum coefficients, and the first and higher order LSP coefficients.

In another embodiment of the invention, the parameter extractor includes an auto-correlation coefficient calculator for extracting auto-correlation coefficients of plurality of orders, and a cepstrum coefficient calculator for extracting cepstrum coefficients of plurality of orders.

In still another embodiment of the invention, the auto-correlation coefficient calculator calculates the first and seventh auto-correlation coefficients, and the cepstrum coefficient calculator calculates the first and third cepstrum coefficients.

In still another embodiment of the invention, the first decision unit uses the first and seventh auto-correlation coefficients and the first cepstrum coefficient for comparing, and the second decision unit uses the third cepstrum coefficient for comparing.

In still another embodiment of the invention, the parameter extractor further includes a power calculator for computing a power for each frame, and the specific period of the audio signal is a period having a power greater than a predetermined value.

A method for speech detection according to the present invention includes the steps of: (a) extracting a plurality of parameters for a speech detection from training data and making a reference model based on the parameters, (b) of extracting the plurality of parameters from each frame of an input audio signal; (c) deciding whether the input audio signal is speech or not, by comparing the parameters extracted from the input audio signal with the reference model. Steps (a) and (b) are preformed for each phoneme, respectively, and step (c) includes the steps of: (d) comparing the parameters extracted from each frame of the input audio signal with the reference model and computing a similarity of each frame with respect to the reference model; (e) deciding a phoneme of each frame of the input audio signal based on the similarity computed for each phoneme; and (f) deciding whether a specific period of the input audio signal including a plurality of frames is speech or not based on the result of the phoneme decision in step (e).

In one embodiment of the invention, step (a) includes the step of making a reference pattern by calculating a mean value and a covariance matrix of the plurality of parameters.

In another embodiment of the invention, the parameters used in the steps are selected from the group consisting of the first and higher order auto-correlation coefficients, the first and higher order PARCOR coefficients, the first and higher order melcepstrum coefficients, and the first and higher order LSP coefficients.

In still another embodiment of the invention, step (b) includes the steps of deriving auto-correlation coefficients of a plurality of orders and deriving cepstrum coefficients of a plurality of orders.

In still another embodiment of the invention, in step (b), the first and seventh auto-correlation coefficients and the first and third cepstrum coefficients are derived.

In still another embodiment of the invention, in step (d), the similarity is a statistical distance between the parameters extracted from the input audio signal and the reference model.

In still another embodiment of the invention, the statistical distance is a log likelihood.

In still another embodiment of the invention, step (e) includes the steps of computing an averaged likelihood by averaging the log likelihood of each frame computed in step (d) with respect to a plurality of successive frames including a target frame for phoneme detection, and detecting a phoneme based on the averaged likelihood.

In still another embodiment of the invention, step (b) includes the step of computing a power for each frame. Step (f) includes the steps of: comparing the power of each frame with a predetermined value; and identifying a period of the input audio signal based on the number of frames having the power equal to or higher than a predetermined value as the specific period of the input audio signal.

In still another embodiment of the invention, step (e) includes step of (e1) deciding a vowel of each frame of the input audio signal, and step (f) includes the steps of: (f1) counting the number of frames detected to be a vowel in step (e1) in the specific period of the input audio signal; (f2) computing the ratio of the number counted in step (f1) to the number of the total frames included in the specific period of the input audio signal; and (f3) judging whether the specific period of the input signal is speech or not based on the ratio computed in step (f2).

In still another embodiment of the invention, step (e) includes step of (e1) deciding a consonant of each frame of the input audio signal, and step (f) includes the steps of: (f1) counting the number of frames detected to be a consonant in step (e1) in the specific period of the input audio signal; (f2) computing the ratio of the number counted in step (f1) to the number of the total frames included in the specific period of the input audio signal; and (f3) judging whether the specific period of the input signal is speech or not based on the ratio computed in step (f2).

In still another embodiment of the invention, step (f) includes the steps of: (g) classifying the phonemes decided in step (e) into first and second phoneme groups; (h1) counting a first number of frames classified into the first phoneme group; (h2) counting a second number of frames classified into the second phoneme group in the specific period of the input audio signal; (i1) computing a first ratio of the first number with respect to the number of frames included in the specific period; (i2) computing a second ratio of the second number with respect to the number of frames included in the specific period; and (j) judging whether the specific period is speech or not using fuzzy reasoning based on the first ratio and the second ratio.

According to another aspect of the present invention, the speech detection method of speech/non-speech judgment for an input audio signal using a plurality of parameters extracted from the input audio signal and a reference model based on training data, includes the steps of: (a) extracting the plurality of parameters from the training data and making a statistical distribution of the parameters for each phoneme; (b) measuring a duration for each phoneme of the training data and making a statistical distribution of the duration of each phoneme; (c) extracting the plurality of parameters from each frame of an input audio signal; (d) calculating parameter likelihood for each frame by comparing the parameters extracted in step (c) with the parameter distribution; (e) deciding a phoneme candidate for each frame of the input audio signal based on the parameter likelihood of each frame; (f) comparing a duration of the phoneme candidate with the duration distribution and calculating duration likelihood for each frame; (g) identifying one phoneme from the phoneme candidates based on the parameter likelihood and the duration likelihood; and (h) judging whether a specific period containing a plurality of frames of the input audio signal is speech or not base on the identified phoneme.

In one embodiment of the invention, step (a) includes the step of making a parameter reference pattern by calculating a mean value and a covariance matrix of the plurality of parameters for each phoneme, and step (b) includes the step of making a duration reference pattern by calculating a mean value and a covariance of the duration of each phoneme.

In another embodiment of the invention, the plurality of parameters in the steps are selected from the group consisting of the first and higher order auto-correlation coefficients, the first and higher order LPC coefficients, the first and higher order PARCOR coefficients, the first and higher order cepstrum coefficients, the first and higher order melcepstrum coefficients and the first and higher order LSP coefficients.

In still another embodiment of the invention, step (c) includes the steps of extracting auto-correlation coefficients of a plurality of orders, and extracting cepstrum coefficients of a plurality of orders.

In still another embodiment of the invention, in step (c), the first and seventh auto-correlation coefficients, and the first and third cepstrum coefficients are derived.

In still another embodiment of the invention, each of the parameter likelihood in step (d) and the duration likelihood in step (f) is a log likelihood.

In still another embodiment of the invention, step (e) includes the steps of: calculating averaged likelihood by averaging the parameter likelihood of each frame with respect to a plurality of successive frames including a target frame for phoneme detection; and detecting the phoneme candidate based on the averaged likelihood.

In still another embodiment of the invention, step (c) further includes the step of computing a power for each frame, and step (h) includes the steps of: comparing the power of each frame with a predetermined value; counting the number of frames which have a power equal to or higher than a predetermined value; and identifying a period of the input audio signal based on the number of frames having the power equal to or higher than a predetermined value as the specific period of the input audio signal.

In still another embodiment of the invention, step (g) includes the steps of: calculating synthetic likelihood based on the parameter likelihood and the duration likelihood; and identifying one phoneme from the phoneme candidates based on the synthetic likelihood, and step (h) includes the steps of: counting a number of frames identified to be a phoneme in step in the specific period of the input audio signal; calculating a ratio of the counted number of the frames with respect to the number of total frames included in the specific period; and deciding whether the specific period of the input audio signal is speech or not base on the calculated ratio.

In still another embodiment of the invention, step (h) includes the steps of: (i) classifying the identified phoneme frames into first and second phoneme groups; (j1) counting a first number of frames classified into the first phoneme group in the specific period of the input audio signal; (j2) counting a second number of frames classified into the second phoneme group in the specific period of the input audio signal; (k1) computing a first ratio of the first number with respect to the number of frames included in the specific period; (k2) computing a second ratio of the second number with respect to the number of frames included in the specific period; and (l) judging whether the specific period is speech or not using fuzzy reasoning based on the first ratio and the second ratio.

According to another aspect of the present invention, the speech detection method of speech/non-speech judgment for an input audio signal using a plurality of parameters extracted from the input audio signal and a reference model based on training data includes the steps of: (a) extracting the plurality of parameters for a speech detection from the training data and determining a threshold value of each parameter for each phoneme; (b) extracting the plurality of parameters from each frame of the input audio signal; (c) deciding whether a frame of the input audio signal is speech or nonspeech by comparing the parameters extracted from the frame with the respective threshold values; (d) deciding whether the frame which has been decided to be nonspeech by step (c) is speech or not, by comparing at least one parameter of the frame with the respective threshold value of the reference model; (e) counting the number of frames which are decided to be speech in step (c) or (d) in a specific period of the input audio signal; (f) calculating a ratio of the counted number in step (e) with respect to the total number of frames included in the specific period; and (g) judging whether the specific period of the input audio signal is speech or not based on the ratio calculated in step (f).

In one embodiment of the invention, the plurality of parameters used in the steps are selected from the group consisting of the first and higher order auto-correlation coefficients, the first and higher order LPC coefficients, the first and higher order PARCOR coefficients, the first and higher order cepstrum coefficients, the first and higher order melcepstrum coefficients, and the first and higher order LSP coefficients.

In another embodiment of the invention, step (b) includes the steps of: extracting auto-correlation coefficients of a plurality of orders; and extracting cepstrum coefficients of a plurality of orders.

In still another embodiment of the invention, in step (b), the first and seventh auto-correlation coefficients, and the first and third cepstrum coefficients are derived.

In still another embodiment of the invention, the first and seventh auto-correlation coefficients and the first cepstrum coefficient are used for comparing in step (c), and the third cepstrum coefficient is used for comparing in step (d).

In still another embodiment of the invention, step (b) further includes the step of computing a power for each frame, and step (g) includes the steps of: comparing the power of each frame with a predetermined value, counting the number of frames which have a power equal to or higher than a predetermined value; and identifying a period of the input audio signal based on the number of frames having the power equal to or higher than a predetermined value as the specific period of the input audio signal.

Thus, the invention described herein makes possible the advantages of (1) providing a method and an apparatus for accurately performing speech detection with a simple construction, by using a statistical method based on the parameters suitable for detecting phonemes such as a vowel and a fricative included in speech, and (2) providing a method and an apparatus for accurately performing speech detection and preventing an erroneous decision, even if stationary noises or noises whose energy predominates in the low-frequency region are added to the speech.

These and other advantages of the present invention will become apparent to those skilled in the art upon reading and understanding the following detailed description with reference to the accompanying figures.

BRIEF DESCRIPTION OF THE DRAWINGS

FIG. 2 is a block diagram schematically showing the processing in a parameter extractor of the speech detection apparatus of the first example of the invention.

DESCRIPTION OF THE PREFERRED EMBODIMENTS

EXAMPLE

Now, Example 1 of the present invention will be described.

First, the outline of a speech detection method of Example 1 will be described hereinafter.

In Example 1, initially, a reference model of each vowel is made based on training data. In making the vowel reference model, several parameters are extracted from each frame of the training data, to calculate a mean value and a covariance matrix of each of the parameters. Next, such parameters are extracted from each frame of an input signal which is to be subject to the speech/nonspeech decision. The extracted parameters are compared with the vowel reference model to compute a similarity (statistical distance measure). Then, a frame-averaged similarity is computed for each vowel, based on the similarities from one frame to be subject to the speech/nonspeech decision (i.e., a target frame) and its preceding and succeeding several frames, and thereby it is decided whether the frames of the input signal are any vowels or not. Furthermore, as for a specific block in the input signal (a speech candidate period), the number of the frames judged to be any one of the vowels is compared with a predetermined threshold value, so as to decide whether the speech candidate period is a speech signal or not.

Here, the above-mentioned parameters may be selected from auto-correlation coefficients, cepstrum coefficients, LPC (linear predictive coding) coefficients, PARCOR (partial auto-correlation) coefficients, melcepstrum coefficients, LSP (line spectrum pair) coefficients, and parameters obtained by FFT (fast Fourier transform) and other speech analyses, etc. Example 1 employs the auto-correlation coefficients and the cepstrum coefficients. A method for obtaining these parameters is not described in detail here, since it is well known and described in the following literature, for example: as for the LSP coefficients, F. K. Soong, B. H. Juang, "Line Spectrum Pair (LSP) and Speech Data Compression", Proc. ICASSP, 84, pp.1.10.1–1.10.4; as for other parameters, L. R. Rabiner, R. W. Schafer, "Digital Processing of Speech Signals", Published by Prentice-Hall, Inc., (1978).

The above-mentioned one frame is a period of the speech signal corresponding to a unit time $N_s \times T$, in the case of sampling $N_s$ samples for analysis with a sampling period T (sampling frequency f). More particularly, the frame means a speech period picked up by multiplying the speech signal by a window function (e.g., a Hamming function or a Hanning function). In this Example 1, the sampling frequency is 10 KHZ, the number of samples is 200, and one frame is 20 msec.

Now, the speech detection method and the speech detection apparatus of Example 1 are described with reference to FIGS. 1 to 6.

Figure 1:
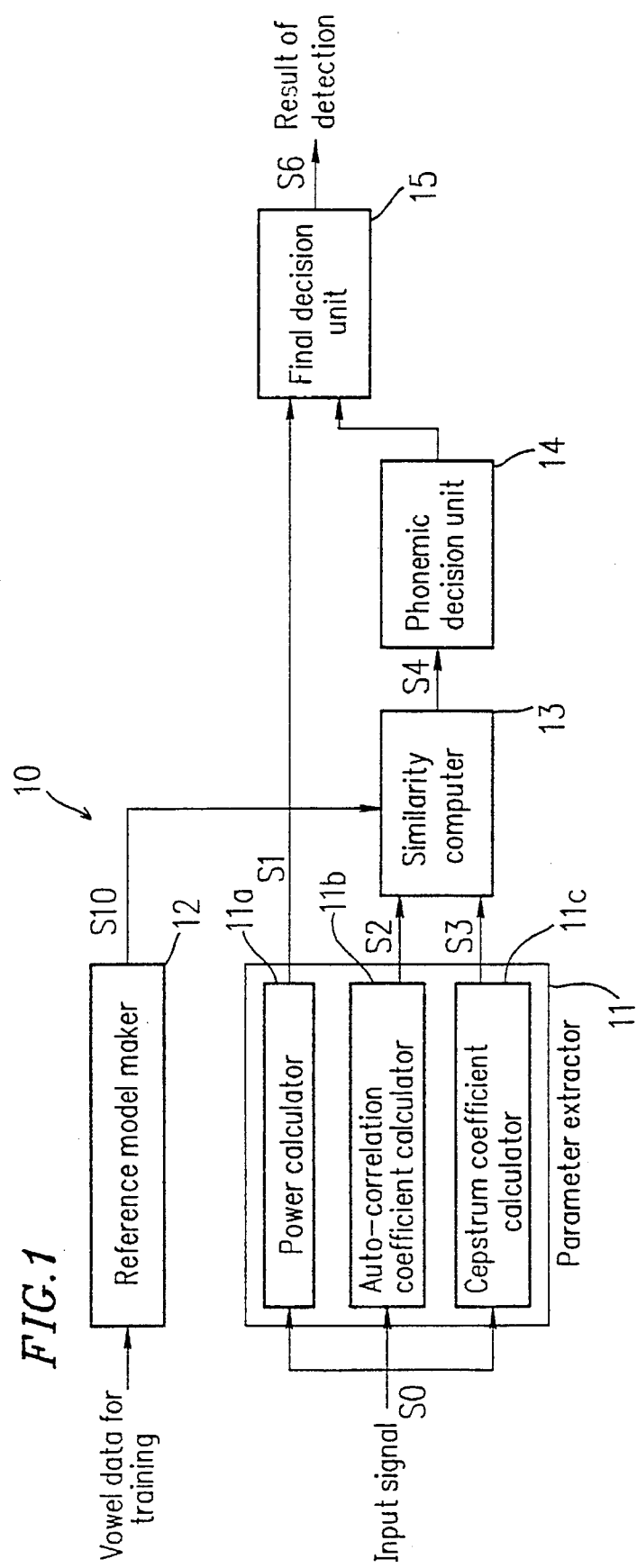
FIG. 1 is a block diagram showing the construction of a speech detection apparatus of a first example of the invention.

FIG. 1 is a block diagram showing the entire construction of a speech detection apparatus 10 of Example 1. The speech detection apparatus 10 includes a parameter extractor 11, a reference model maker 12, a similarity computer 13, a phonemic decision unit 4 and a final decision unit 15. The parameter extractor 11 extracts a plurality of parameters from an input audio signal so as to be used in the speech detection. Based on given extensive training data for vowels, the reference model maker 12 makes a reference model for each of the vowels by using the parameters extracted by the parameter extractor 11. The similarity computer 13 computes a log likelihood of each parameter for each frame by comparing the parameters derived for each frame by the parameter extractor 11 with the reference model of each vowel. The phoneme decision unit 14 computes a frame-averaged log likelihood for each vowel, by averaging the log likelihoods of a target frame and its preceding/succeeding several frames, and decides whether the segment including the target frame is a vowel or not, based on the frame-averaged log likelihood. The final decision unit 15 decides whether the speech candidate period of the input audio signal is a speech signal or not, by comparing the number of frames judged to be a vowel with a predetermined threshold value.

As shown in FIG. 1, the parameter extractor 11 includes a power calculator 11a for computing a power of each frame; an auto-correlation coefficient calculator 11b for computing auto-correlation coefficients for each frame, and a cepstrum coefficient calculator 11c for computing cepstrum coefficients for each frame. As described in detail later, the first and seventh auto-correlation coefficients, and the first and third cepstrum coefficients are computed. These parameters are used for detecting vowel property of the input audio signal.

The method of conducting a speech detection by the speech detection apparatus 10 will be described in more detail.

An audio signal S0 input from a microphone (not shown) is applied to the parameter extractor 11. The parameter extractor 11 extracts a plurality of parameters necessary for the speech detection, in the following manner.

The power calculator 11a computes a power value $P_i$ of each frame of the audio signal S0, e.g., in accordance with the following Equation (1).

$$P_i = \sum_{j=1}^{200} S_j \times S_j \qquad (1)$$

Here, $P_i$ denotes a power value of a frame i, and $S_j$ denotes a j-th sample value in the frame i of the input signal. The power value $P_i$ is normalized (e.g., to be a value from 0 to 1), with the difference between the maximum value and the minimum value of a large power portion, so that the power value $P_i$ can be generally treated even if the power of the audio signal S0 varies due to a change of the utterance condition. The computed power value $P_i$ is applied to the final decision unit 15 as a signal S1.

In the auto-correlation coefficient calculator 11b, auto-correlation coefficients Ai(m) are computed from the input signal S0 for each frame, in accordance with Equation (2). Ai(m) denotes a normalized m-th auto-correlation coefficient of the frame i (Ai(m) is normalized by a 0-th auto-correlation coefficient Ai(0)).

$$Ai(m) = \sum_{j=1}^{200} S_j \times S_{j+m} \qquad (2)$$

This Example 1 uses the first auto-correlation coefficient Ai(1) as a low order auto-correlation coefficient and the seventh auto-correlation coefficient Ai(7) as a high order auto-correlation coefficient. However, auto-correlation coefficients other than the first and seventh orders are also usable, and it is possible to use three or more orders of auto-correlation coefficients.

In the cepstrum coefficient calculator 11c, the m-th order cepstrum coefficient Ci(m) of the frame i is obtained by a linear prediction analysis. Example 1 uses the first cepstrum coefficient Ci(1) and the third cepstrum coefficient Ci(3).

The processing in the parameter extractor 11 schematically shown by FIG. 2 will be described hereinafter.

First, the input signal is sampled with the sampling frequency of 10 KHz (step 101), and 20 sample values $S_j$ (j=1 through 200) per frame (20 ms) are picked up (step 102) by multiplying it by a window function (Hamming function). After performing a pre-emphasis (step 103), Sj×Sj' (j'=j, j+1, j+7) is obtained in accordance with the above-mentioned Equation (2). By summing up each of Sj×Sj's of each frame, auto-correlation coefficients Ai(m) which are not normalized are computed (step 104). The auto-correlation coefficient Ai(0) where j'=j (i.e., O-th order) is the power value $P_i$. The auto-correlation coefficients Ai(m) are normalized with this value (step 105). Thereafter, LPC coefficients are obtained by using a usual technique, and the cepstrum coefficients Ci(m) (m=1, 3) are computed (steps 106 and 107). The parameters used in Example 1 are obtained by the process as described above.

In the reference model maker 12, parameters to be used in the parameter extractor 11 are extracted from vowel portions of various audio data for training. Then, a mean value and a covariance matrix for each vowel are computed based on the parameter extracted from the training data so as to provided the reference model for each vowel.

The parameters for each vowel k are extracted as follows. First, a set of Q training data $\{y_{k,q}\}$ (q =1, . . . , Q) (hereinafter referred to as $\{y_k\}$ with q omitted for simplicity, while { } indicative of a set composed of Q data) is prepared for each vowel k. In the case where r parameters for the vowel k are extracted, each of the data $y_k$ can be represented as an r-dimensional vector determined by r components (i.e., a vector in an r-dimensional parameter space). This r-dimensional vector $y_q$ in the parameter space will be called a parameter vector.

In this Example 1, the model shape of the reference model of each phoneme is represented by a mean value $\mu_k$ and a covariance matrix $\Sigma_k$ of the parameter vector $\{y_k\}$. The mean value $\mu_k$ is an r-dimensional vector, and the covariance matrix $\Sigma_k$ is an r x r dimensional matrix. Assuming that the Yk is a multidimensional normal distribution of r-dimension, its mean value $\mu_k$ and covariance matrix $\Sigma_k$ can be calculated as shown by Equations (3) and (4), where t denotes a transpose.

$$\mu_k = \frac{1}{Q} \sum_{q=1}^{Q} y_q \qquad (3)$$

$$\Sigma_k = \frac{1}{Q} \sum_{q=1}^{Q} y_q (y_q - \mu_k)(y_q - \mu_k)^t \qquad (4)$$

The training data for each vowel k may be prepared as follows: a signal portion corresponding to each vowel k is picked up from the speech signal of a reference speaker, and the data of the central frame of the vowel portion of the signal, and the preceding and succeeding two frames are used as vowel data for training. In addition, by using data of a plurality of reference speakers, it is possible to make the reference model less affected by the variances of utterance caused by different speakers.

The similarity computer 13 computes a similarity of an input vector $x_i$ with respect to each reference model $v_k$ based on the set of r parameters given by the parameter extractor 11 for each frame (i.e., an input vector $x_i$ in the r-dimensional space given for each frame i) and the reference model $v_k$ of each vowel k made by the vowel reference model maker 12. For computation of the similarity, the statistical distance measure (log likelihood) is used with assuming that the input vector $x_i$ is the multidimensional normal distribution in the r-dimensional space.

A log likelihood $L_{ik}$ of the input vector $x_i$ in the i-th frame to the reference model $v_k$ for each vowel k is calculated in accordance with Equation (5).

$$L_{ik} = -\frac{1}{2}(x_i - \mu_k)^t \Sigma_k^{-1}(x_i - \mu_k) - \frac{1}{2}\ln|\Sigma_k| + C \qquad (5)$$

where t denotes transpose, −1 denotes an inverse matrix of $\Sigma_k$, and C denotes a constant.

The phonemic decision unit 14 performs a vowel decision of the target frame, based on the target frame, and the preceding N frames and succeeding N frames. These 2N+1 frames are called a segment. By using a segment and not a single frame, a more accurate decision becomes possible in consideration of duration characteristics of vowels.

The phonemic decision unit 14 computes a frame-averaged likelihood $Lik^{ave}$ in the segment, by using the log likelihood $L_{ik}$ computed by the similarity computer 13. If the averaged log likelihood $L_{ik}^{ave}$ satisfies Inequality shown in the expression (6), the target frame is regarded as the vowel k:

$$L_{ik}^{ave} = \frac{1}{2N+1} \sum_{j=i-N}^{i+N} L_{jk} \geq L_{kTH} \qquad (6)$$

where $L_{kTH}$ is a decision threshold value (the threshold value of the frame-averaged log likelihood) with respect to the vowel reference model $v_k$.

Figure 3A:
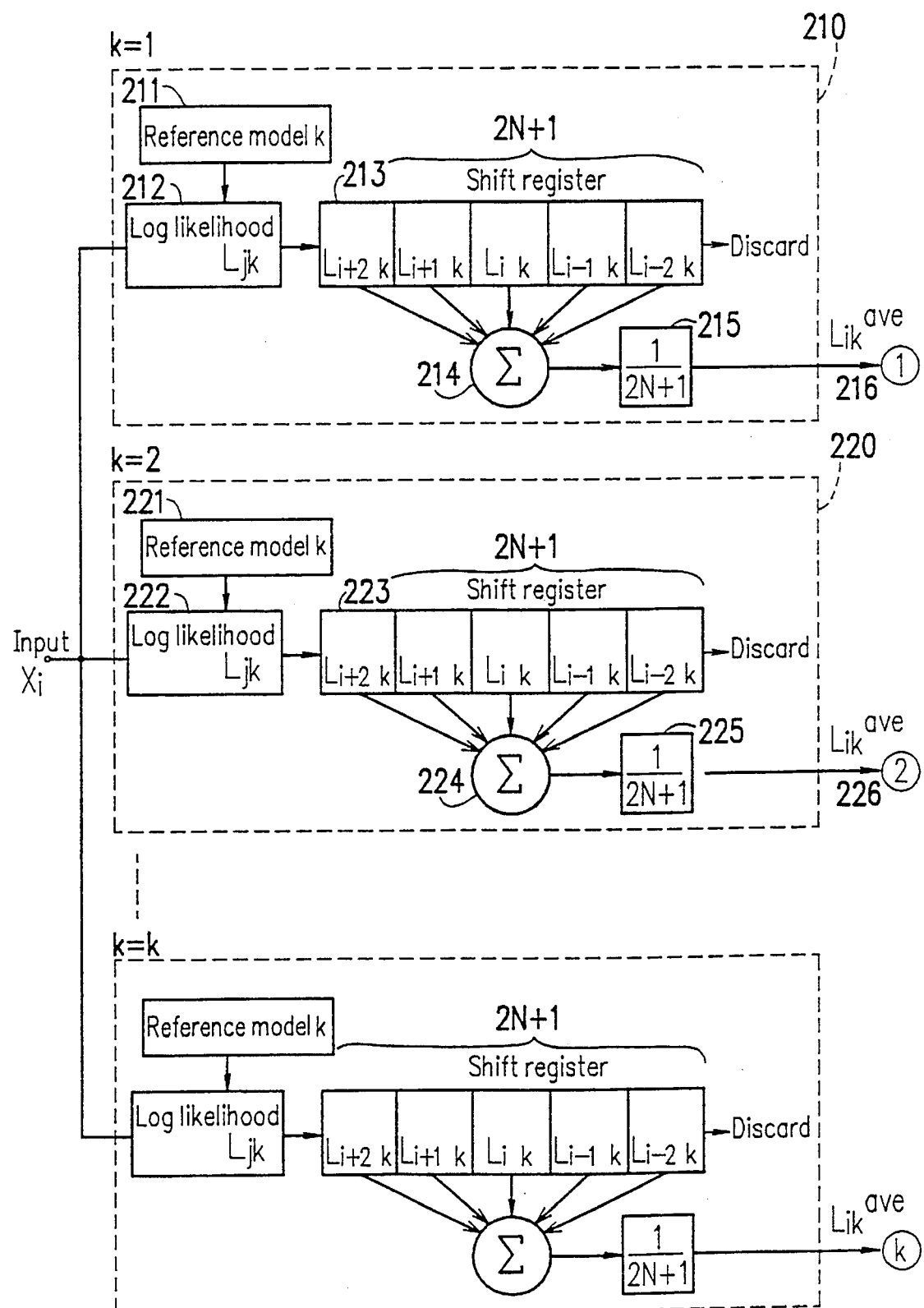
FIGS. 3A and 3B are flowcharts each schematically showing the processing in a phonemic decision unit of the speech detection apparatus of the first example of the invention.
Figure 3B:
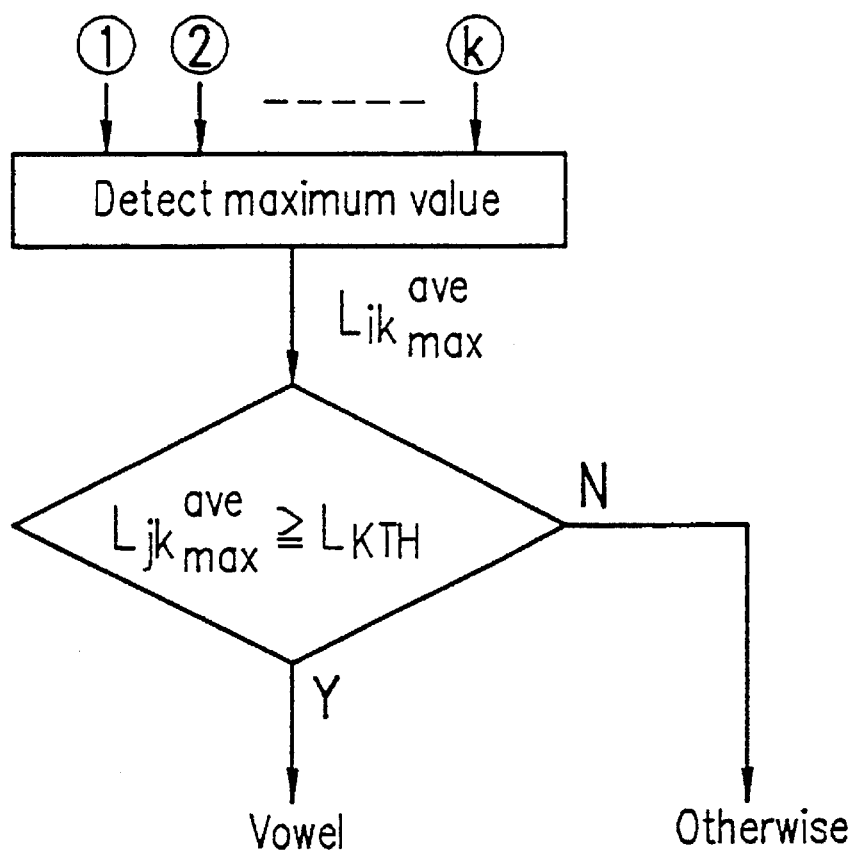

FIGS. 3A and 3B each schematically shows an exemplary processing in the phonemic decision unit 14. A block 210 shows the procedure for obtaining a frame-averaged log likelihood $L_{ik}^{ave}$ with respect to the i-th frame. 2N+1 likelihood values of $L_{ik}$ computed by the similarity computer 13 (from j=i−N to j=i+N) are latched in a shift register 213 (the case of N=2 is shown in the figures). By an adder 214 and a divider 215, the frame-averaged log likelihood $L_{ik}^{ave}$ of the vowel k is obtained from these 2N+1 values of log likelihood $L_{ik}$. At the next (i+1)th frame, $L_{i-N, k}$ is discarded from the shift register 213, and in place of the discarded one, $L_{i+N+1, k}$ is latched to be processed in the same way. Blocks 210, 220, . . . etc. are provided for corresponding vowels, respectively.

As shown by FIG. 3B, the maximum output ($L_{ik, max}^{ave}$) is detected among the outputs from blocks 210, 220 . . . etc. (step 332). This maximum output is compared with the predetermined threshold value $L_{kTH}$ for a decision as to whether it is a vowel or not (step 333). This processing may be performed by using a usual microcomputer.

The log likelihood is a statistical estimation value assuring an effective and comprehensive decision of the influence of each parameter. Accordingly, by using the log likelihood, a phonemic decision method can be realized. The phonemic decision method is less affected by the variances of the parameters than the method of using threshold values for respective parameters, the variance being caused by addition of a stationary noise, or the like. Additionally, it has an advantage in that there is no need for determining the threshold value of each parameter by using a heuristic method. Moreover, since a segment composed of several frames rather than a single frame is used as a unit in the phonemic decision of the input signal, a more effective phonemic decision becomes possible for locally stationary speech sounds (i.e., continuing over several frames) like vowels.

The final decision unit 15 makes a final decision as to whether a specific period of the input signal is a speech signal or not, based on the decision results given by the phonemic decision unit 14 and the power value given by the parameter extractor 11.

Figure 4:
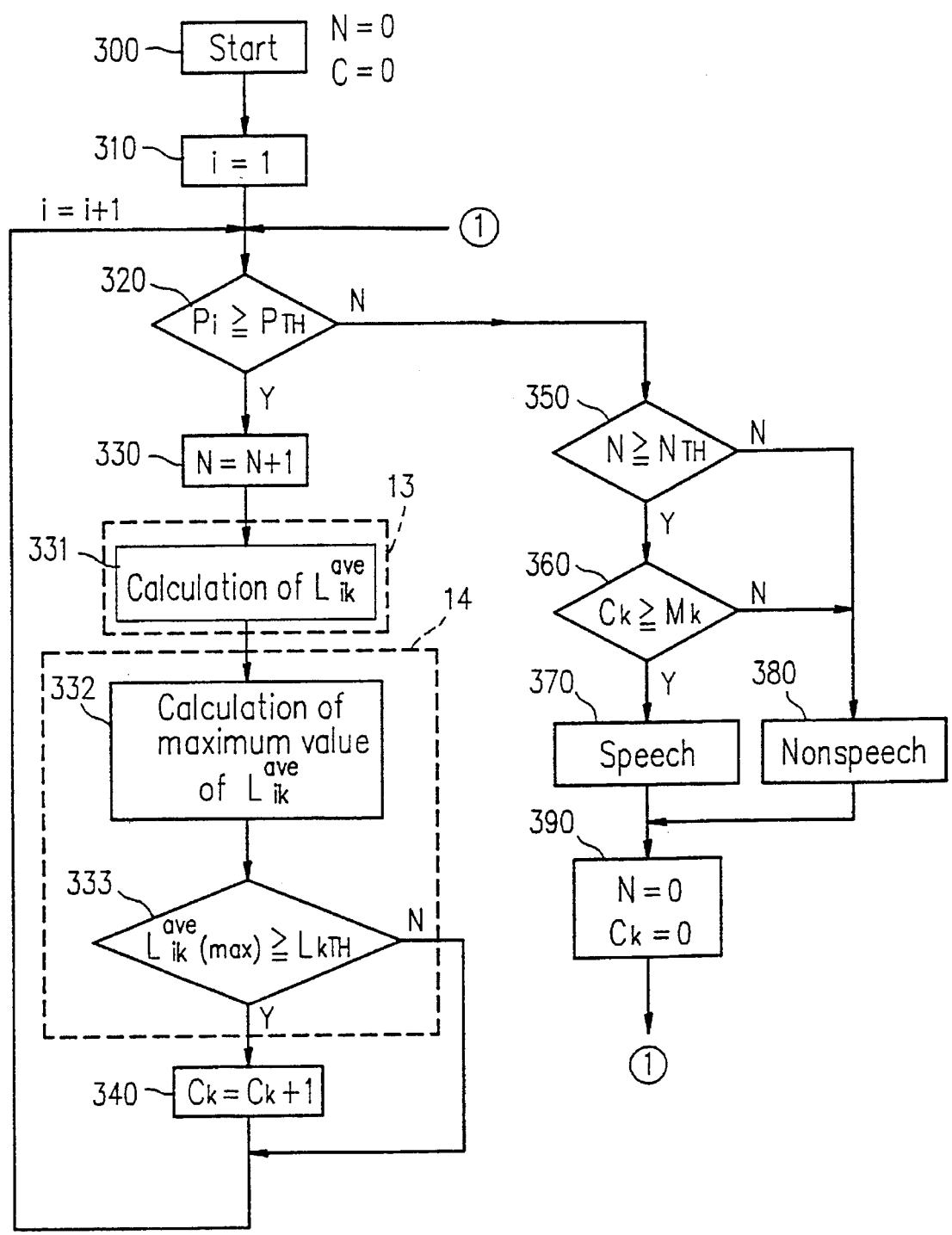
FIG. 4 is a flowchart schematically showing the decision method used in a final decision unit of the first example of the invention.

The decision method of the final decision unit 15 will be described with reference to FIG. 4. The final decision unit 15 compares a power value $P_i$ obtained by the power calculator 11a with a predetermined power threshold value $P_{TH}$, and detects a speech candidate period which is composed of successive frames each having a power more than the threshold value $P_{TH}$, the number of the successive frames being larger than a predetermined number (steps 320 and 350). More specifically, the phonemic decision is performed for the frame whose power value Pi is equal to or higher than the threshold value $P_{TH}$, while counting the number of such frames (step 330). Then, the number $C_k$ of the segments each judged to be a vowel is counted (step 340). The steps 330 to 340 are repeated as long as the power value $P_i$ is equal to or larger than the threshold value $P_{TH}$, and when the power value $P_i$ becomes smaller than the threshold value $P_{TH}$, the number of repetitions (i.e., the number of successive frames) is detected (step 350). If the number of repetition is equal to or larger than the predetermined threshold value, a block of the successive frames is judged to be a speech candidate period.

The number $C_k$ of the segments each judged to be a vowel k in the speech candidate period by the phonemic decision unit 14 is compared (step 360) with a predetermined threshold number $M_k$ of vowel segments. If $C_k$ satisfies the condition expressed by Inequality (7), the a speech candidate period is judged to be a speech signal (step 370).

$$C_k \geq M_k \qquad (7)$$

The processing as described above is performed for all of the vowels k, and if Inequality (7) is satisfied for at least one vowel k, the speech candidate period is judged to be a speech signal. The threshold value $M_k$ may be predetermined from the training data.

In addition, a predetermined upper threshold $M_{max}$ may be set so as to prevent a noise which continues for a long time with a large power from being erroneously judged as speech, as expressed by Inequality (8).

$$M_{max} > C_k \geq M_k \qquad (8)$$

The results of a computer simulation experiment conducted using the speech detection apparatus of Example 1 will be described hereinafter.

The parameters used in Example 1 besides the power are: normalized first auto-correlation coefficient, normalized seventh auto-correlation coefficient, the first cepstrum coefficient and the third cepstrum coefficient. The inverse of the first cepstrum coefficient is equal to the first LPC coefficient. These parameters are relatively well separated between speech and other nonstationary noises (based on the results of a preliminary experiment). In addition, these parameters are easily obtained in the computation process of the cepstrum coefficient by the LPC analysis.

The normalized first auto-correlation coefficient and the first LPC coefficient are parameters suitable for a voiced/unvoiced discrimination. The normalized seventh auto-correlation coefficient is a parameter suitable for distinguishing low-frequency noises. The third LPC cepstrum coefficient is a parameter which particularly indicates characteristics of /i/among five vowels.

Two kinds of audio data; speech data and noise data are used in the simulation experiment. As speech data, 16 phonemes were used to be detected: (/a/,/i/,/u/,/e/,/o/,/b/,/d/,/g/,/m/,/n/,/N/,/s/,/h/, /r/,/w/,/y/). These phonemes were obtained from 12 words uttered by ten male speakers and recorded in an anechoic room. The boundaries of all the phonemes are determined by manual observation. On the other hand, 22 noises as shown in Table 1 were used as noise data. These noises were collected considering a situation such as a meeting room in which the speech/nonspeech detection apparatus of Example 1 is used.

TABLE 1

| Noise No. | Noise Source | Time length(s) |
|---|---|---|
| 00 | Silence (background noise) | 6 |
| 01 | Turning over pages of document (5 to 6 sheets of paper) | 27 |
| 02 | Turning over pages of magazine (ASCII) | 27 |
| 03 | Turning over pages of newspaper | 35 |
| 04 | Putting down documents with thud (5 files) | 15 |
| 05 | Fluttering 1 sheet of paper | 23 |
| 06 | Crumpling 1 sheet of paper | 23 |
| 07 | Putting 10 sheets of a document in order | 17 |
| 08 | Writing characters on a sheet of paper on desk | 27 |
| 09 | Tapping desk with pen | 18 |
| 10 | Rapping desk with hand | 22 |
| 11 | Knocking on desk with hand | 15 |
| 12 | Dropping thing to floor with thump | 17 |
| 13 | Putting down a coffee cup (together with saucer) | 16 |
| 14 | Putting down a coffee cup (cup only) | 15 |
| 15 | Stirring drink with spoon | 24 |
| 16 | Touching microphone with hand (with windshield) | 17 |
| 17 | Tapping microphone with hand (without windshield) | 24 |
| 18 | Touching microphone with paper | 29 |
| 19 | Clearing one's throat | 16 |
| 20 | Breathing out | 21 |
| 21 | Clapping one's hands | 25 |
| 22 | Touching cloths | 30 |

The conditions of analyzing the speech and noise data are shown in Table 2.

TABLE 2

| | |
|---|---|
| Sampling frequency: | 10 kHZ |
| Analysis window: | 20 ms Hamming window |
| Frame period: | 10 ms |
| Pre-emphasis: | 1 to 0.9 z−1 |
| LPC analysis degree: | 12th, |

The training data of vowel spoken by five male speakers is used to make the reference model. The parameters were extracted by using the frame in phonetical center and its preceding/succeeding two frames for each vowel in the speech signal. For computation efficiency, the computation was conducted by using only diagonal elements of the covariance matrix, on the assumption that there is no correlation between individual parameters.

Using the above-mentioned reference model, the speech detection and noise discrimination (erroneous detection) were tested. The speech detection experiment was performed for ten speakers including five reference speakers whose vowel data was used for making the reference model. The noise discrimination experiment was performed by using the nonstationary noises shown in Table 1.

Figure 5:
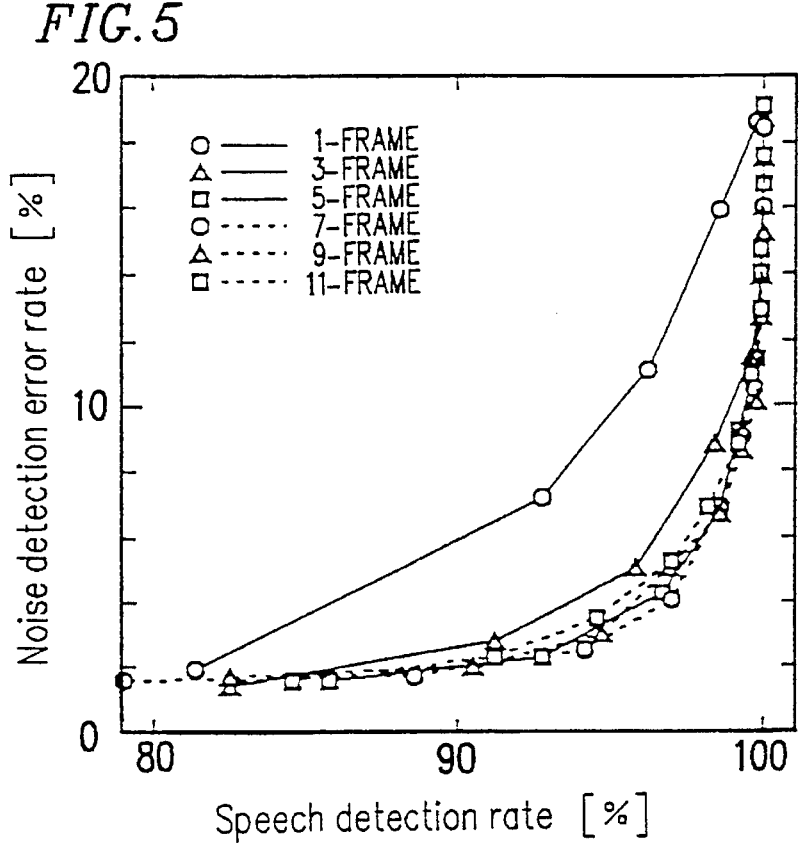
FIG. 5 is a graph showing the relationship between a speech detection rate and a noise detection error rate when varying a vowel segment length.

FIG. 5 shows a relationship between the speech detection rate and the noise detection error rate when varying a vowel segment length. The speech detection rate is a rate at which an input speech signal is properly judged to be speech. The noise detection error rate is a rate at which an input noise signal is erroneously judged to be speech. In order to realize a speech detection apparatus having good performance, it is important to detect an input speech signal correctly as speech, and not to judge an input noise signal erroneously as speech. As is seen from FIG. 5, when setting such a decision threshold value that makes the speech detection rate approximately 100%, the noise detection error rate rises as well. Accordingly, discrimination performance for speech and noise can be optimized by setting the decision threshold value at a proper value.

FIG. 5 shows the experimental results where the segment length (i.e., 2N+1 frames: referred to as a vowel segment length hereinafter) used for deriving a frame-average of the log likelihood in the similarity computer 13, was changed from one to eleven frames. In case where the vowel segment length is more than five frames, there is little difference in the detection performance. As a result, the speech detection rate of 99.3% (with noise detection error rate of 9.0%) was obtained when the vowel segment length is seven frames, and the decision threshold value =−1.2. This value is experimentally obtained and is the decision threshold value shown in Equation (6).

Then, in order to evaluate the detection performance of the speech detection apparatus 10 in an environment with a stationary noise, the speech detection rate and the noise detection error rate were measured for the input signal with an additional white noise signal.

Figure 6:
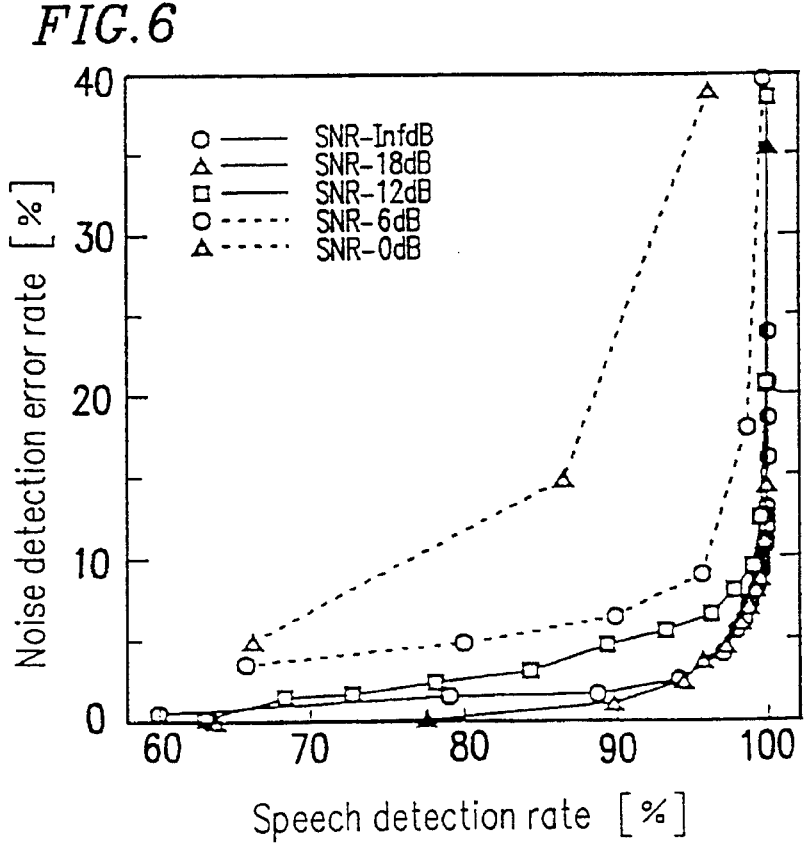
FIG. 6 is a graph showing the relationship between a speech detection rate and a noise detection error rate when varying an S/N ratio.

FIG. 6 shows a relationship between the speech detection rate and the noise detection error rate when varying a signal-to-noise (S/N) ratio. In this experiment, the vowel segment length is fixed to seven frames. As seen from FIG. 6, the detection performance is affected only a little up to the S/N ratio of 12 dB.

As described above, the speech detection apparatus 10 of Example 1 performs: a highly accurate decision based on the characteristics of the phonemes; and a plurality of frames are regarded as one unit for making decision. This makes it possible to offer a speech detection apparatus assuring a correct decision of speech by discriminating a speech signal among from various audio signals including noises.

This Example 1 uses auto-correlation coefficients and cepstrum coefficients as parameters for detecting vowel property. It is to be noted that the parameters are not limited thereto, and PARCOR coefficients, melcepstrum coefficients and the like are also usable.

EXAMPLE 2

Next, a second example of the present invention is described.

The outline of the speech detection method in the second example is described below.

Also in the second example, a reference model is made for each phoneme based on the training data. In the first example, the reference models are made only for vowels. In the second example, the reference models are made for phonemes including consonants in addition to the vowels. Additionally considering the phonemic characteristics of the language to be detected (in this example, Japanese), the detection accuracy is improved. The final decision unit decides whether the input signal is speech or not, on the basis of the fuzzy reasoning. The other components and constructions are the same as those in the first example. Also in this example, the sampling frequency is set to be 10 KHz, the number of samples is 200, and one frame is set to be 20 msec.

Next, the speech detection method and the speech detection apparatus in the second example are described by referring to the figures.

Figure 7:
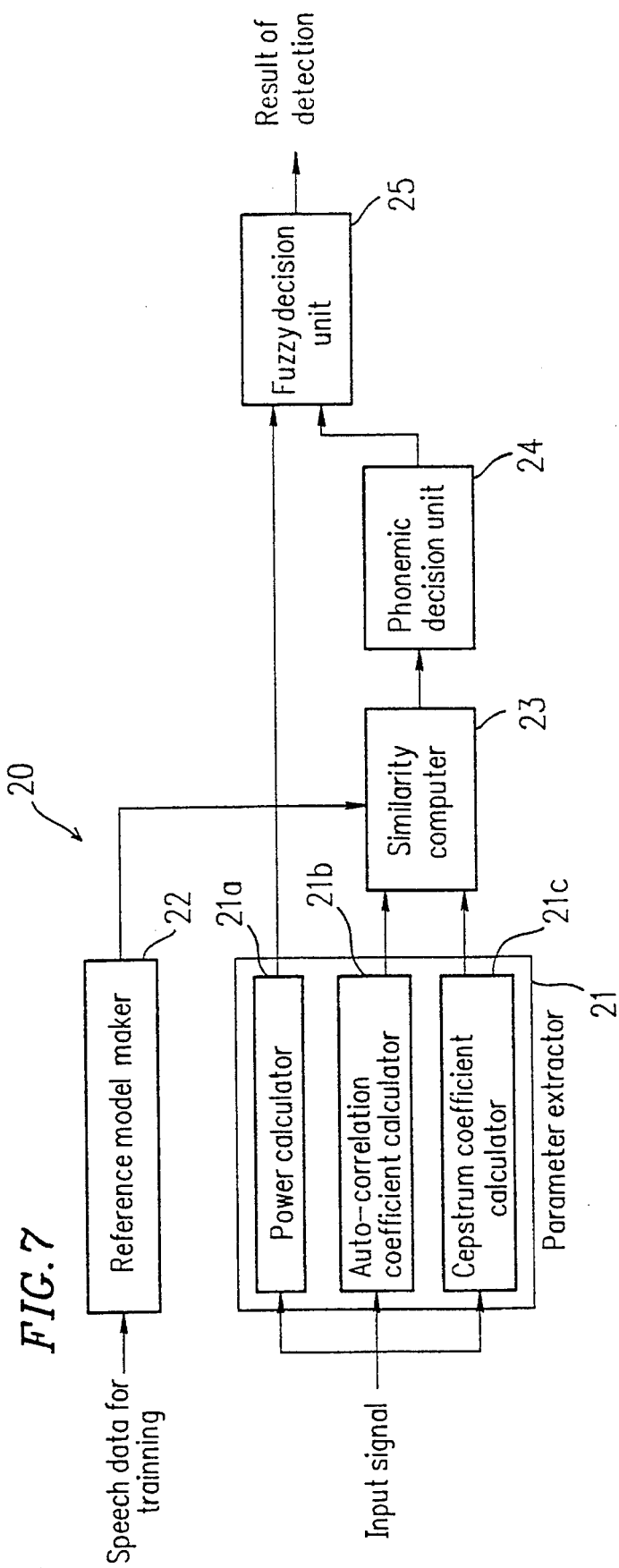
FIG. 7 is a block diagram showing the entire construction of a speech detection apparatus of a second example of the invention.

FIG. 7 is a block diagram showing the entire construction of a speech detection apparatus 20 in the second example. The speech detection apparatus 20 includes a parameter extractor 21, a reference model maker 22, a similarity computer 23, a phonemic decision unit 24, and a fuzzy decision unit 25. The parameter extractor 21 extracts a plurality of parameters used for the speech detection from the input audio signals. The reference model maker 22 makes a reference model for each phoneme using the parameters extracted in the parameter extractor 21, based on given extensive phonemic data for training. The similarity computer 23 compares parameters derived from each frame by the parameter extractor 21 with the reference model of each phoneme, so as to compute a log likelihood of each parameter for each frame. The phonemic decision unit 24 calculates a frame-averaged log likelihood for each phoneme based on the log likelihood of a target frame for the phonemic decision and preceding and succeeding N frames thereof (these 2N+1 frames are referred to as a segment), and decides whether the segment is any one of phonemes based on the frame-averaged log likelihood.

The fuzzy decision unit 25 decides whether a speech candidate period of the input audio signal is a speech signal or not, by comparing the number of frames which are judged to be phonemes with a predetermined threshold value.

As is shown in FIG. 7, the parameter extractor 21 includes a power calculator 21a for calculating a power of each frame, an auto-correlation coefficient calculator 21b for calculating auto-correlation coefficients for each frame, and a cepstrum coefficient calculator 21c for calculating cepstrum coefficients for each frame. As will be described below, as for the auto-correlation coefficients, the first and seventh coefficients are calculated, and as for the cepstrum coefficients, the first and third coefficients are calculated. These parameters are used for detecting whether the input audio signal is a phoneme or not.

Hereinafter, a method for detecting speech by using the speech detection apparatus 20 will be described in more detail.

The audio signal input through a microphone (not shown) is applied to the parameter extractor 21. The parameter extractor 21 extracts a plurality of parameters required for the speech detection in accordance with the same procedure as in the parameter extractor 11 which is described in the first example.

The reference model maker 22 first extracts parameters to be used in the parameter extractor 21 from extensive speech data for training. Then, using the parameters which are extracted from the training data, a mean value and a covariance matrix are calculated for each phoneme, so as to make a reference model for each phoneme.

In this example, the reference models are made for seven kinds of phonemes in two categories, i.e., five vowels /a/, /i/, /u/, /e/, and /o/, and two unvoiced fricatives /h/ and /s/. The reason why these seven kinds of phonemes are used is that the spectra of these phonemes are relatively stable, and hence suitable for the detection in which the local continuity of speech signal is utilized. Other phonemes such as nasal, voiced plosive, affricate, liquid, and semivowel may also be used, because every phoneme indicates the feature of the speech.

The reference model maker 22 makes a reference model by calculating the mean value $\mu_k$ and the covariance matrix $\Sigma_k$ for each phoneme, on the basis of Equations (3) and (4), in accordance with the same procedure as in the reference model maker 12. In the second example, k indicates each phoneme.

The similarity computer 23 calculates a similarity of an input vector $x_i$ with respect to a reference model $v_k$, based on a set of r parameters for one frame (i.e., an input vector $x_i$ in an r-dimensional space given for each frame i) and a reference model $v_k$ for a phoneme k which is made by the reference model maker 22. The similarity computer 23 calculates a statistical distance measure (a log likelihood $L_{ik}$) on the basis of Equation (5), in accordance with the same procedure as in the similarity computer 13.

The phonemic decision unit 24 decides whether a target frame is a phoneme or not, based on the target frame for the phonemic detection and the preceding and succeeding N frames (these (2N+1) frames are referred to as a segment). The phonemic decision unit 24 calculates a frame average $L_{ik}^{ave}$ of the log likelihoods $L_{ik}$ on the basis of the left side of Equation (6) in accordance with the same procedure as in the phonemic decision unit 14. If the averaged log likelihood $L_{ik}^{ave}$ satisfies the condition of the left side of Equation (6), the segment is regarded as a phoneme k.

The fuzzy decision unit 25 finally decides whether a specified period of the input signal is a speech signal or not using the fuzzy reasoning, based on the judged result supplied from the phonemic decision unit 24 and the power value supplied from the parameter extractor 21. Herein, the specified period means "a speech candidate period" having a power equal to or higher than a certain threshold value in the input signal, the same as in the first example.

In this example, the fuzzy reasoning is used for the speech detection for the following reasons.

Various phonemes appear in speech, especially in speech during conversation. The occurrence frequencies and the patterns of these phonemes are specifically determined by the uttered language and the grammar of the language to some extent. For example, in the case of Japanese speech, the utterances of phonemes are constituted by repetitions of vowel, consonant and silence, such as V, C+V, V+C+V (V denotes a vowel and C denotes a consonant). Accordingly, if the occurrence frequencies of respective phonemes are obtained in a relatively long time interval, the phonemes such as vowels and consonants are assumed as being uttered at specific frequencies which are determined to some extent. Accordingly, in this example, the speech detection is performed based on the occurrence frequencies of respective phonemes in the speech signal; that is, the existence ratio of respective phonemes in a certain period of the speech signal. In addition, by using the fuzzy reasoning, an accurate speech detection can be performed with less operation amount. This is another reason for using the fuzzy reasoning.

Figure 8A:
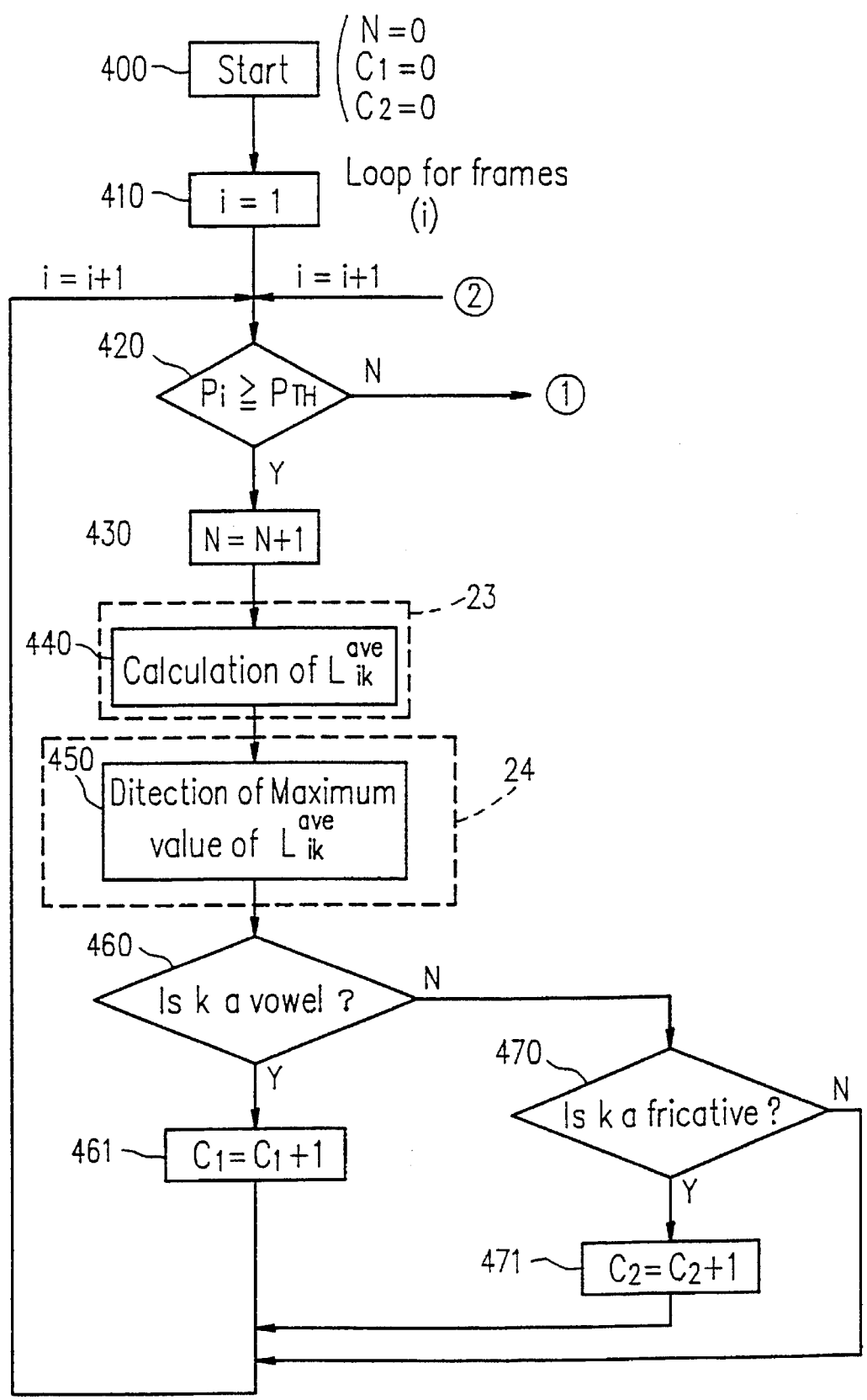
FIG. 8A and 8B are flowcharts each schematically showing the processing in a fuzzy decision unit.
Figure 8B:
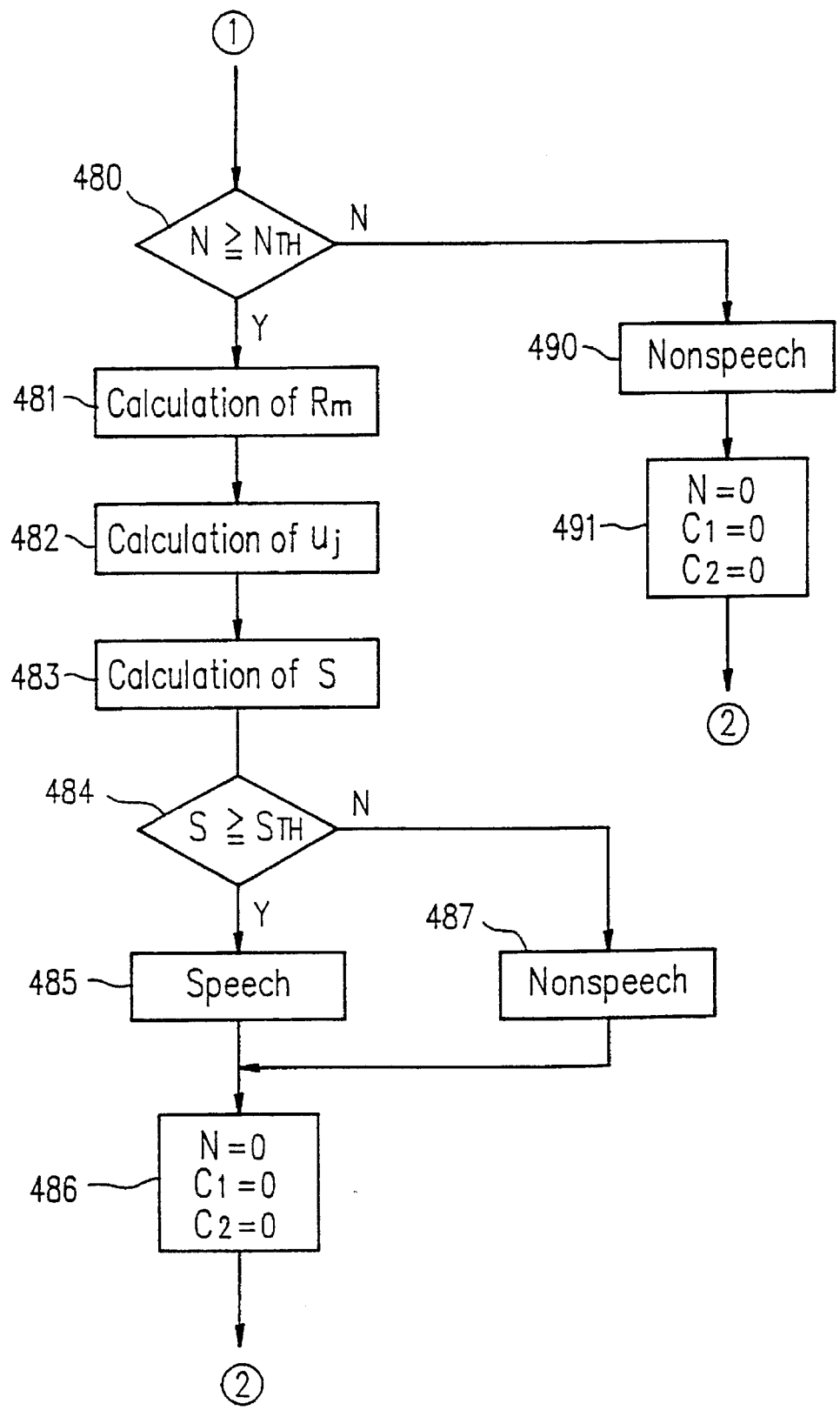

A more specific decision method used in the fuzzy decision unit 25 will be described with reference to FIGS. 8A and 8B. The fuzzy decision unit 25 compares the power value Pi obtained by the power calculator 21a with a predetermined power threshold value $P_{TH}$, and detects a speech candidate period in which frames having powers equal to or higher than the threshold value $P_{TH}$, the number of the succeeding frames being equal to or larger than a predetermined value (steps 420 and 480). More particularly, as to the frames having powers equal to or higher than the threshold value $P_{TH}$, the phonemic detection is performed (steps 440–460, and 470), while counting the number of frames (step 430). Step 440 is performed in the similarity computer 23, and step 450 is performed in the phonemic decision unit 24. If the power value $P_i$ is equal to or larger than the threshold value $P_{TH}$, the step for phonemic decision is repeatedly performed. When the power value $P_i$ becomes smaller than the threshold value $P_{TH}$, the number of repetitions (i.e., the number of continuous frames) is detected (step 480). If the repeated number is equal to or larger than a predetermined threshold value, the continuous frame period is judged to be a speech candidate period.

In the thus decided speech candidate period, the speech detection is performed in the following manner.

First, if the phonemic segment is judged to be /a/, /i/, /u/, /e/, or /o/ (step 460), the phonemic segment is categorized into a vowel group. If the phonemic segment is judged to be /h/ or /s/ (step 470), the phonemic segment is categorized into a fricative group. That is, the phonemic segments are classified into two categories. If the phonemic segment is judged to belong to the vowel group, the number of phonemic segments in the first category is increased (the number of segments $C_1$: step 461). If the phonemic segment is judged to belong to the fricative group, the number of phonemic segments in the second category is increased (the number of segments $C_2$ : step 471). From the respective numbers of segments $C_m$ (m =1, 2), the occupation rate $R_m$ in each category is obtained on the basis of Equation (9,) (step 481).

$$R_m = \frac{C_m}{N_p} \times 100 \tag{9}$$

Herein, m denotes the number of categories, and $N_p$ denotes the number of frames included in the speech candidate period. In the above example, the occupation rate is obtained by classifying the phonemic segments into two vowel and fricative categories. Alternatively, the occupation rate may be obtained using three or more categories. For example, the occupation rate can be obtained for each phoneme.

When the occupation rate $R_m$ is used as an input variable for the fuzzy reasoning, and the speech property S is used as an output variable, the reasoning rule of the fuzzy reasoning is generally expressed in Expression (10).

Rule j:

if $R_1$ is $A_{j1}$ and ... and $R_m$ is $A_{jm}$, then $S_j$ is $f_j$ (10)

where j denotes a rule number $A_{jm}$ denotes a membership function, and $f_j$ denotes a real number. In this example, a simplified fuzzy reasoning, in which the consequent part of the reasoning rule is expressed as a real number, is used as the fuzzy reasoning. Another fuzzy reasoning can be used (because in any fuzzy reasoning, the feature of speech is expressed based on the phonemic property in the speech).

When input data $(R_1, \ldots, R_m)$ is input, the following conclusion expressed in Equation (11) is obtained from Expression (10) (step 482).

$$u_j = A_{j1}(R_j) \wedge \ldots \wedge A_{jm}(R_m) \wedge 1 \tag{11}$$

where $\wedge$ denotes a min operation for obtaining a minimum value in each term, and $u_j$ denotes a matching degree of each reasoning rule. There are a plurality of reasoning rules, which are expressed by Expression (10), so that the final reasoning result is expressed in Equation (12) by totally considering the result of Equation (11) (step 483).

$$S = \frac{\sum_j u_j \times f_j}{\sum_j u_j} \qquad (12)$$

The final output S indicates how much the speech candidate period has the speech property. The speech property S is compared with a predetermined threshold value $S_{TH}$ (step 484). If the value of the speech property S is equal to or larger than the threshold value $S_{TH}$, the speech candidate period is judged to be speech (step 485).

Figure 9:
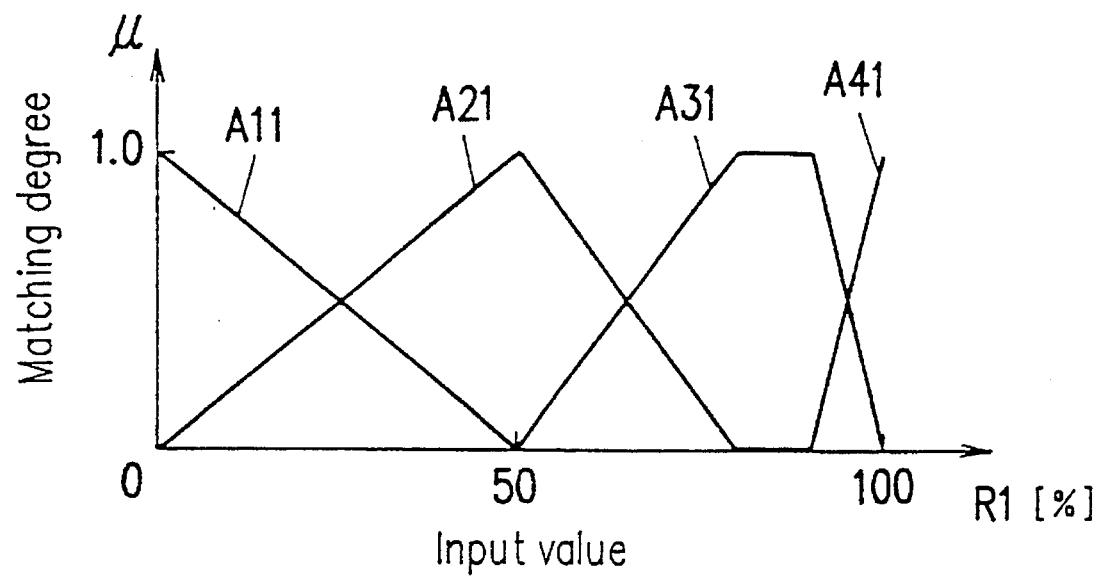
FIG. 9 is a diagram showing membership functions A11 to a41 for a vowel group.
Figure 10:
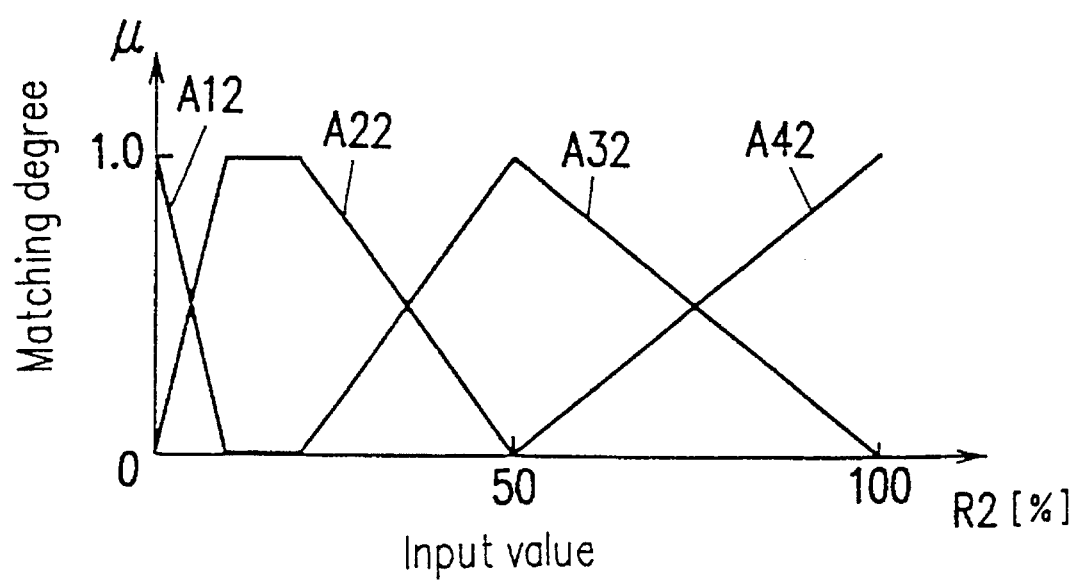
FIG. 10 is a diagram showing membership functions A12 to A42 for a fricative group.

Next, the reasoning rule in Expression (10) is specifically described for the case where the number of categories (phonemic groups) is two. The vowel group corresponds to m=1, and the fricative group corresponds to m=2. FIG. 9 represents the membership functions A11 to A41 of the vowel group, and FIG. 10 represents the membership functions A12 to A42 of the fricative group.

In this case, $A_{j1}$ in Expression (10) includes four types, i.e., A11 to A41, and $A_{j2}$ also includes four types, i.e., A21 to A42. Accordingly, there are 16 possible combinations, so that the number of rules is 16. Table 3 shows the rules in the case where the membership functions shown in FIGS. 9 and 10 are used. The values in the rule table indicate the real numbers $f_j$ of the consequent parts of the rules corresponding to the respective combinations. These values are obtained by a preliminary experiment. Other values may be used in a practical use of the speech detection apparatus, since more accurate detection becomes possible by properly selecting these values to be suitable for the actual environment.

TABLE 3

| Reasoning rule | Vowel | | | |
|---|---|---|---|---|
| Fricative | A11 | A21 | A31 | A41 |
| A12 | 0 | 5 | 10 | 0 |
| A22 | 0 | 20 | 100 | 30 |
| A32 | 0 | 10 | 40 | 0 |
| A42 | 0 | 0 | 0 | 0 |

From the rule table, each $S_j$ is obtained, and a value $A_{nm}(R_m)$ of the membership function is obtained for the given input value $R_m$ on the basis of FIGS. 9 and 10 (m=1, 2, and n=1 to 4). By using these values, Expression (10), Equations (11) and (12) are evaluated, so as to obtain the speech property S.

In this way, based on the fuzzy reasoning, it is possible to express how much the speech candidate period has the speech property. By performing such operations for all of the speech candidate periods, the final speech detection is performed. That is, if the final output S is equal to or larger than the predetermined threshold value $S_{TH}$, it is judged to be speech. If the final output S is smaller than the predetermined threshold value $S_{TH}$, it is judged to be nonspeech.

As described above, the speech detection apparatus 20 in this example performs the judgment with high accuracy based on the feature of the phonemes, and the judgment is performed by regarding a plurality of frames as one group. In this way, it is possible to provide a speech detection apparatus which can accurately detect speech from various audio signals including noises with a relatively simple construction.

EXAMPLE 3

Now, Example 3 of the present invention is described.

The outline of the speech detection method of Example 3 will be described hereinafter.

In Example 3, a parameter distribution (which corresponds to the reference model in Example 1) of each phoneme is initially made based on the training data. In Example 3, not only parameters but also duration of each phoneme are extracted from the training data, so as to make the duration distribution of each phoneme. The speech detection is conducted with a comprehensive decision, based on the duration distribution as well as the parameter distribution. Thus, temporal characteristics of the phonemes of the language (Japanese language, in this case) are also taken into consideration, so that the detection accuracy may be further improved. Similar to Examples 1 and 2, the sampling frequency is set to be 10 KHz, the number of samples is 200, and one frame is set to be 20 msec.

Then, a speech detection method and a speech detection apparatus of Example 3 will be described with reference to FIGS. 11 through 13.

Figure 11:
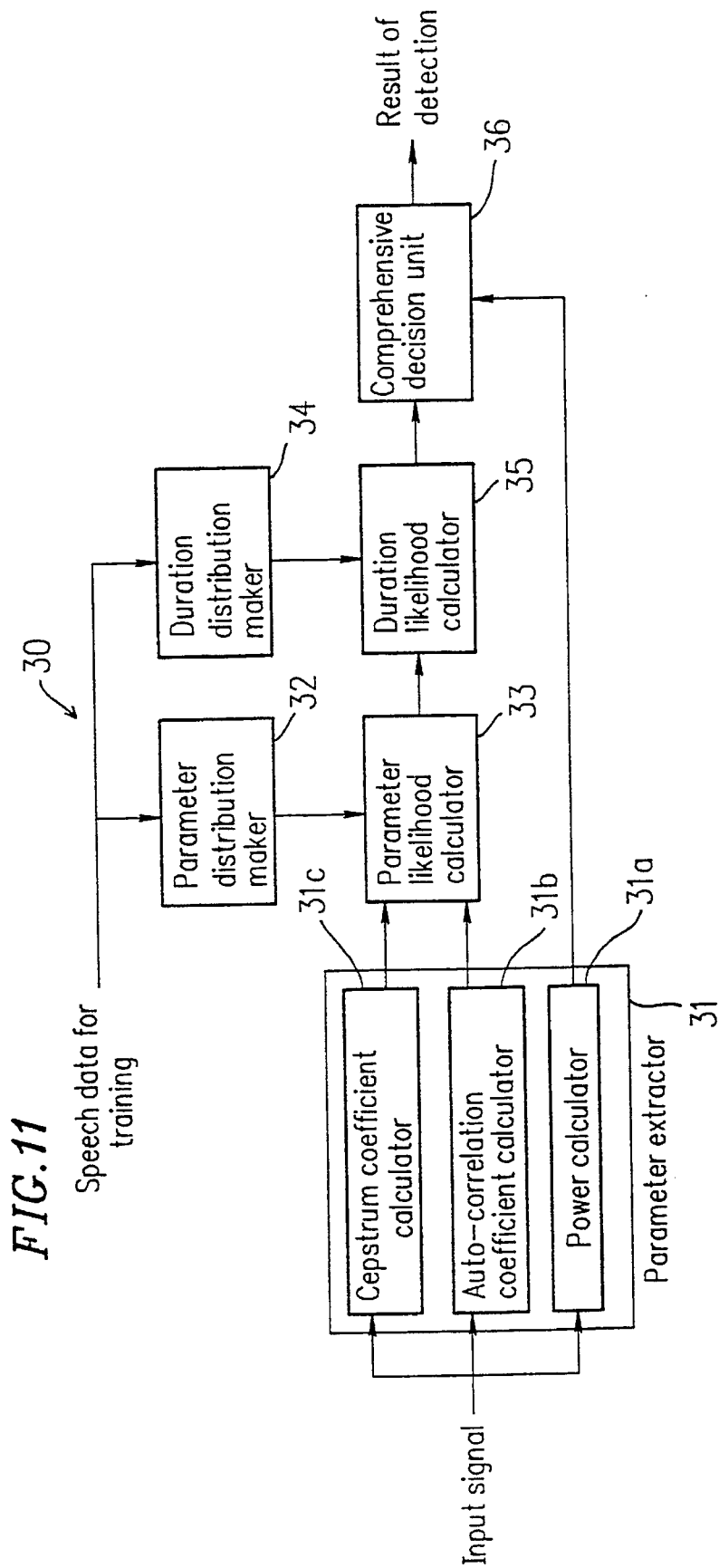
FIG. 11 is a block diagram showing the entire construction of a speech detection apparatus of a third example of the invention.
Figure 12:
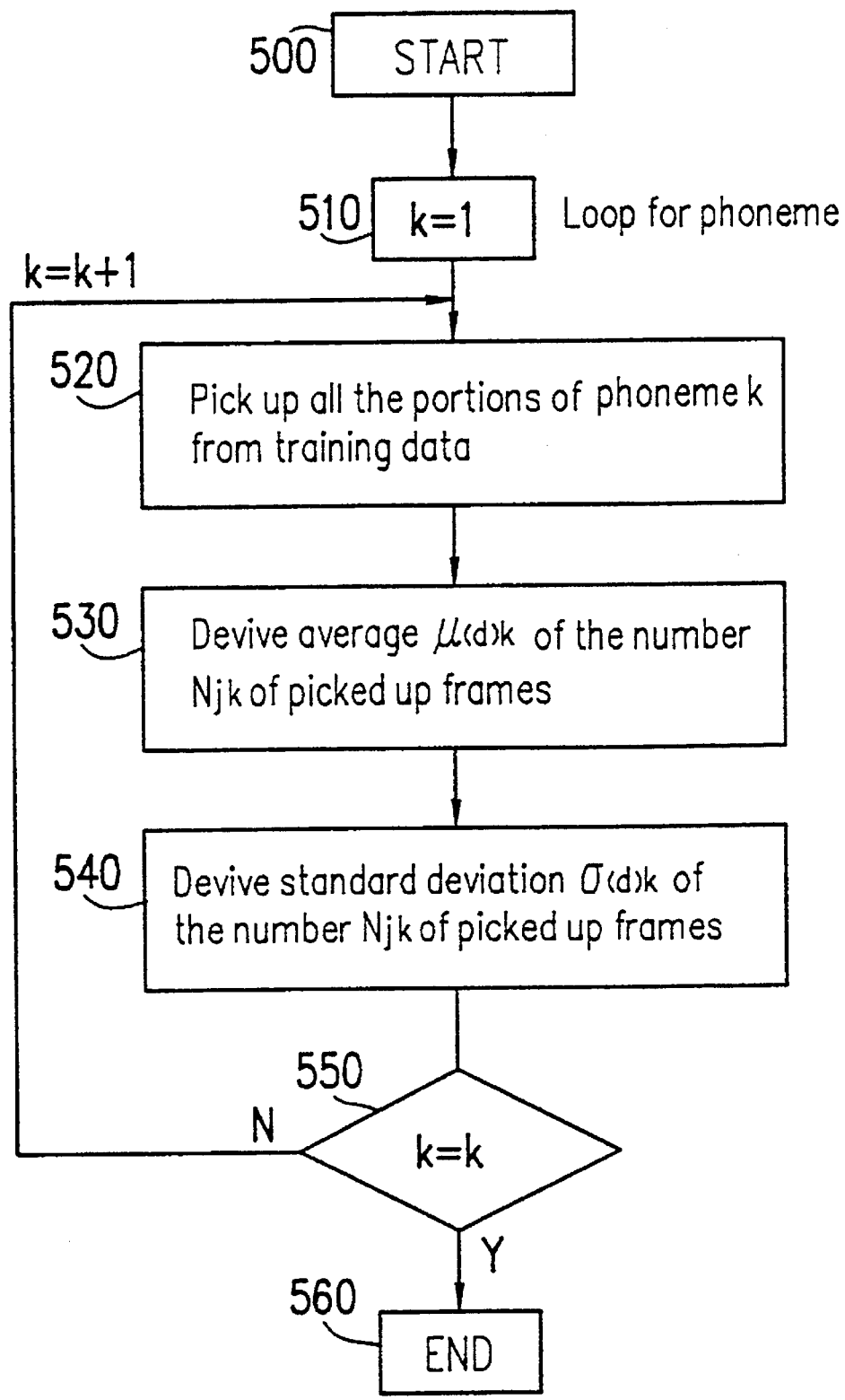
FIG. 12 is a view schematically showing the procedure of operation in a duration distribution maker.

FIG. 11 is a block diagram showing the entire construction of a speech detection apparatus 30. The speech detection apparatus 30 includes a parameter extractor 31, a parameter distribution maker 32, a parameter likelihood calculator 33, a duration distribution maker 34, a duration likelihood calculator 35, and a comprehensive decision unit 36. The parameter extractor 31 extracts a plurality of parameters used for speech detection from the input audio signal. The parameter distribution maker 32 makes the parameter distribution for each phoneme, using the parameters extracted by the parameter extractor 31. The parameter likelihood calculator 33 computes a log likelihood of each parameter for each frame, by comparing the parameters supplied from the parameter extractor 31 with the parameter distribution. The duration distribution maker 34 makes the duration distribution for each phoneme based on the training data. The duration likelihood calculator 35 computes a frame-averaged log likelihood based on the log likelihood of each frame so as to obtain the duration of each phoneme. It computes a duration likelihood of each phoneme, by comparing the obtained duration with the duration distribution. The comprehensive decision unit 36 decides whether the speech candidate period of the input audio signal is a speech signal or not, by using a comprehensive likelihood based on the duration distribution as well as the parameter distribution.

As shown in FIG. 11, the parameter extractor 31 includes a power calculator 31a for computing a power of each frame; an auto-correlation coefficient calculator 31b for calculating auto-correlation coefficients for each frame; and a cepstrum coefficient calculator 31c for calculating cepstrum coefficients for each frame.

Hereinafter, the method of speech detection by the speech detection apparatus 30 will be described in more detail.

The audio signal input from a microphone (not shown) is applied to the parameter extractor 31. The parameter extractor 31 extracts a plurality of parameters required for speech detection by the same procedure as those of the parameter extractors 11 and 21 of Examples 1 and 2, respectively. Also in Example 3, the first and seventh auto-correlation coefficients and the first and third cepstrum coefficients are computed. These parameters are used for detecting phonemic property of the input audio signal.

In the parameter distribution maker 32, the parameters used in the parameter extractor 31 are extracted from extensive speech data for training. Then, the parameter distribution is made for each phoneme by using the parameters extracted from the training data. In Example 3, a mean value and a covariance matrix are calculated on the assumption that the parameter distribution is a normal distribution. Gamma distribution, Poisson distribution or the like is also usable as a function representative of the parameter distribution as well as the normal distribution.

The parameter distribution maker 32 calculates a mean value $\mu(c)_k$ and a covariance matrix $\Sigma(c)_k$ for each phoneme by the same procedure as that of the reference model maker 12 or the reference model maker 22, in accordance with the following Equations (13) and (14), and thereby makes the parameter distribution. In Equation (13), k stands for each phoneme (phoneme number), and (c) stands for a value obtained by the parameter distribution maker 32.

$$\mu(c)_k = \frac{1}{Q} \sum_{q=1}^{Q} y_q \qquad (13)$$

$$\Sigma(c)_k = \frac{1}{Q} \sum_{q=1}^{Q} (y_q - \mu(c)_k)(y_q - \mu(c)_k)^t \qquad (14)$$

The parameter likelihood calculator 33 calculates a statistical distance measure (log likelihood) of an input vector $x_i$ with respect to the parameter distribution of each phoneme k made by the parameter distribution maker 32 based on a set of r parameters for each frame (i.e., an input vector in r-dimensional space in each frame i) supplied from the parameter extractor 31 and the parameter distribution of each phoneme k made by the parameter distribution maker 32. That is, the parameter likelihood calculator 33 computes a log likelihood $L(c)_{ik}$ in accordance with Equation (15), through the same procedure as those of the similarity computers 13 and 23.

$$L(c)_{ik} = -\frac{1}{2}(x_i - \mu(c)_k)^t \Sigma(c)_k^{-1}(x_i - \mu(c)_k) - \frac{1}{2} \ln|\Sigma(c)_k| + C_c \qquad (15)$$

The duration distribution maker 34 makes the duration distribution of each phoneme, by calculating a mean value and a covariance of the duration for each phoneme using extensive speech data for training. FIG. 12 schematically shows the procedure of processing in the duration distribution maker 34. First, portions each corresponding to the phoneme k are picked up from the extensive speech signal data by observation, for preparing extensive phonemic data of the phoneme k for training (step 520). Usually, the phoneme portion corresponds to an utterance continuing over several successive frames.

Then, from the extensive phonemic data, the mean value $\mu(d)k$ and the covariance $\sigma(d)k$ for a phoneme k are derived by computation (steps 530 and 540). Here, (d) stands for a value obtained by the duration distribution maker 34. Similar to the case of the parameter distribution maker 32, the mean value and the covariance are calculated on the assumption that the duration distribution is a normal distribution. As a function representative of the duration distribution, Gamma distribution, Poisson distribution or the like is also usable, as well as the normal distribution.

The above-mentioned operation is performed for all the phonemes k, whereby obtaining the duration distribution.

Figure 13:
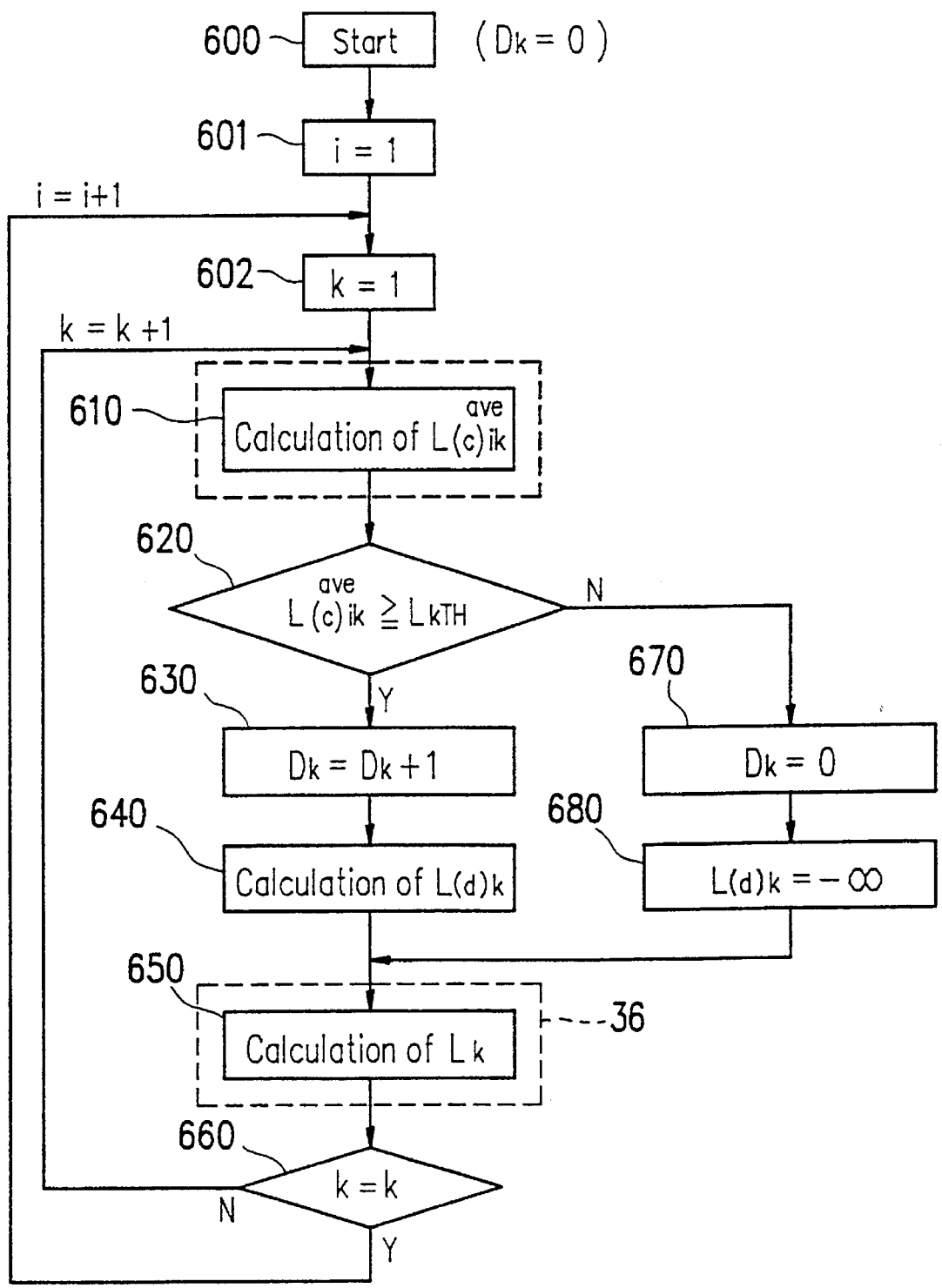
FIG. 13 is a view schematically showing the procedure of operation in a duration likelihood calculator.

FIG. 13 schematically shows the procedure of processing in the duration likelihood calculator 35. In the duration likelihood calculator 35, first, a frame-averaged log likelihood $L(c)_{ik}^{ave}$ is derived from the log likelihood $L(c)_{ik}$ of each frame for each phoneme, computed by the parameter likelihood calculator 33 (step 610). Then, a phonemic detection is performed (step 620) by comparing the average log likelihood $L(c)_{ik}^{ave}$ with a predetermined threshold value $L(c)_{kTH}$. Such processings in the duration likelihood calculator 35 are essentially similar to those of the phoneme decision units 14 and 24, described in Examples 1 and 2, respectively. The duration likelihood calculator 35 computes the frame-averaged log likelihood $L(c)_{ik}^{ave}$ of the log likelihood $L(c)_{ik}$ in accordance with Equation (16), by using the target frame i for phoneme detection and its preceding and succeeding N frames (these 2N+1 frames are called a segment). If the frame-averaged log likelihood $L(c)_{ik}^{ave}$ is equal to or larger than the predetermined threshold value $L(c)_{kTH}$, i.e., in the case of Inequality (17) being satisfied, the target frame is judged to be a phoneme k. Here, $L(c)_{kTH}$ is a discrimination threshold value for each phoneme k.

$$L(c)_{ik}^{ave} = \frac{1}{2N+1} \sum_{j=i-N}^{i+N} L(c)_{jk} \qquad (16)$$

$$L(c)_{ik}^{ave} \geq L(c)_{kTH} \qquad (17)$$

The duration $D_k$ (the number of successive frames) is obtained by counting how many frames of phoneme k that satisfy Inequality (17) succeed one another.

At step 620, in the case where $L(c)_{ik}^{ave}$ is equal to or larger than the discrimination threshold value, the duration $D_k$ of the phoneme k is subject to an increment by one (step 630). With respect to this duration $D_k$, a duration likelihood $L(d)_k$ is calculated in accordance with Equation (18) (step 640).

$$L(d)_k = -\frac{(Dk - \mu(d)_k)^2}{2\sigma(d)_k^2} - \frac{1}{2} \ln \sigma(d)_k^2 + C_d \qquad (18)$$

The comprehensive decision unit 36 calculates a synthetic likelihood $L_k$ in accordance with following Equation (19), based on the frame-averaged likelihood $L(c)_{ik}^{ave}$ and the duration likelihood $L(d)_k$, $$L_k = w \times \left( \frac{1}{D_k} \sum_{i=1}^{D_k} L(c)_{ik}^{ave} \right) + (1 - w) \times L(d)_k \qquad (19)$$

In the case where $L(c)_{ik}^{ave}$ is smaller than the discrimination threshold value, the duration $D_k$ of the phoneme k is made 0 (step 670). That is, if once judged not to be a phoneme k at step 620, the duration $D_k$ of the phoneme k is reset, and the duration is recounted again. In this case, the duration likelihood $L(d)_k$ is made $-\infty$ (step 680). Since the synthetic likelihood $L_k$ is supplied as a positive value in Equation (19), by making the duration likelihood $L(d)_k = -\infty$, the synthetic likelihood $L_k$ can reflect non-phonemic property (unless the coefficient (1−w) of the second term of Equation (19) is 0, the influence of $-\infty$ is prominent.)

After this operation is performed for all the phonemes k, the procedure advances to the analysis of the next frame. Unless being reset at step 670, the above-mentioned value of duration $D_k$ is held and increases through the frames. Accordingly, the duration likelihood $L(d)_k$ is computed at the step 640 in each frame based on the duration $D_k$ having the value representing the number of frames which have been succeeded.

As seen from Equation (19) above, the synthetic likelihood $L_k$ is obtained by adding the averaged value of $L(c)_{ik}^{ave}$ with respect to the duration $D_k$ and the duration likelihood $L(d)_k$, together with a specific weight w. Finally, the phoneme k having the largest synthetic likelihood $L_k$ is detected.

Further, by determining how often the detected phoneme k appears within a specific period (occurrence frequency of each phoneme within a specific period), the final decision as to whether the period is speech or noise is made.

Similar to Examples 1 and 2, a speech candidate period having a power higher than the predetermined threshold value is used as the period of the input signal for the final decision. An occupation rate $R_k$ of each phoneme k is obtainable by Equation (20), where the speech candidate period includes J frames, and $C_k$ is the number of phonemes k detected in the J frames. When any one of the phonemes k is equal to or larger than the predetermined threshold value $R_{KTH}$ (see Inequality (21)), it is judged that speech is detected.

$$R_k = \frac{C_k}{J} \times 100 \qquad (20)$$

$$R_k \geq R_{kTH} \qquad (21)$$

Here, $Rk_{TH}$ is a speech detection threshold value for each phoneme k. The comprehensive decision unit 36 may provide the speech/nonspeech decision based on the fuzzy reasoning described in Example 2.

As described above, the speech detection apparatus 30 of Example 3 uses two statistical distances in combination: a statistical distance obtained by comparing parameters of each phoneme extracted from the input signal with the parameter distribution made from training data; and a statistical distance obtained by comparing the duration of each detected phoneme with the duration distribution of each phoneme, made from training data. In this way, it is possible to provide a speech detection apparatus and method which can accurately detect a speech from various audio signals including noises with a relatively simple construction.

EXAMPLE 4

Next, a fourth example of the invention is described.

The outline of the speech detection method in the fourth example is described below.

In the fourth example, a parameter threshold value of each phoneme which is used for the speech detection is first determined, based on extensive training data. By comparing some parameters extracted from the input signal with the threshold values obtained from the training data, a general (first-stage) judgment is performed. Next, by comparing other some parameters with the threshold values, a more accurate (second-stage) judgment is performed. In this way, by performing the judgment in two stages based on the features of respective phonemes, the judgment is efficiently performed and the detection accuracy is enhanced. Also in this example, the sampling frequency is set to be 10 KHz, the number of samples is 200, and one frame is set to be 20 msec.

Figure 14:
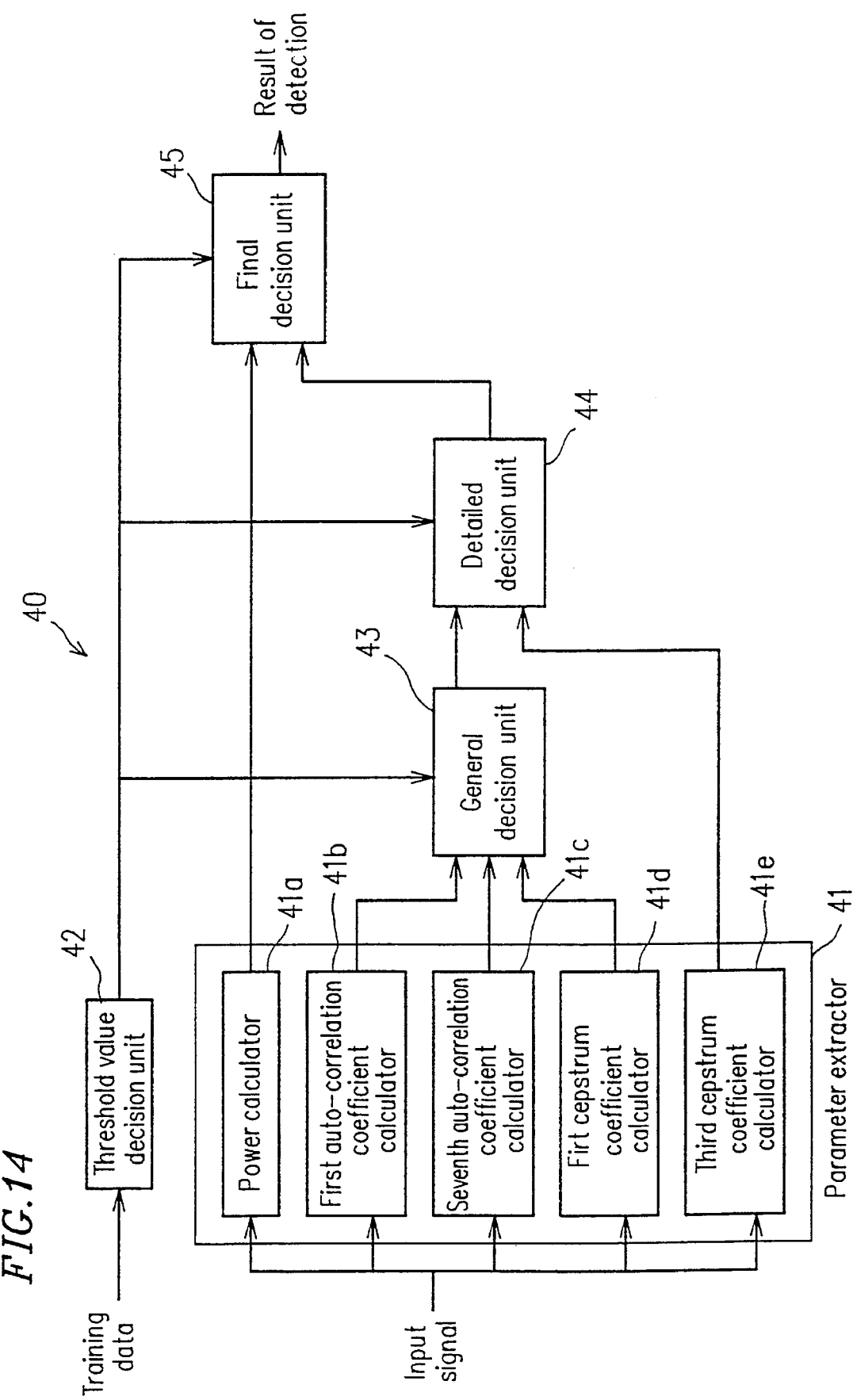
FIG. 14 is a block diagram showing the entire construction of a speech detection apparatus of a fourth example of the invention.

FIG. 14 is a block diagram showing the entire construction of a speech detection apparatus 40 in the fourth example. The speech detection apparatus 40 includes a parameter extractor 41, a threshold value decision unit 42, a general decision unit 43, a detailed decision unit 44, and a final decision unit 45. The parameter extractor 41 extracts a plurality of parameters for the speech detection from the input audio signal. The threshold value decision unit 42 decides respective threshold values for the parameters which are extracted by the parameter extractor 41, based on a given extensive training data for vowels. The general decision unit 43 generally decides whether the input signal is speech or not, by comparing the parameters obtained for each frame which are applied from the parameter extractor 41 with the respective threshold values. The detailed decision unit 44 provides a more accurate decision, based on the judged result by the general decision unit 43 and other parameters. The final decision unit 45 decides whether a speech candidate period of the input audio signal is a speech signal or not, by comparing the number of frames judged to be speech with a predetermined threshold value.

As is shown in FIG. 14, the parameter extractor 41 includes a power calculator 41a for calculating a power for each frame, an auto-correlation coefficient calculator 41b for calculating a first auto-correlation coefficient, an auto-correlation coefficient calculator 41c for calculating a seventh auto-correlation coefficient, a cepstrum coefficient calculator 41d for calculating a first cepstrum coefficient, and a cepstrum coefficient calculator 41e for calculating a third cepstrum coefficient. These parameters are used for detecting the voiced sound property (vowel property) of the input audio signal.

Next, the above-mentioned parameters used in this example are described. The following are results which are obtained by extracting these parameters from extensive audio data, and by examining the occurrence frequency distribution.

As in the simulation experimentation in the first example, the examined audio data sets are two kinds of audio data, i.e., speech data and noise data. As the speech data, sixteen phonemes (/a/, /i/, /u/, /e/, /o/, /b/, /d/, /g/, /m/, /n/, /N/, /s/, /h/, /r/, /w/, /y/) in 212 words which were uttered by 10 men were recorded in an anechoic room. For all of the phonemes, the phoneme boundary is obtained by observation. As the noise data, the 22 kinds of noises shown in Table 1 in the first example were used. The analysis conditions for the speech and noise data are also shown in Table 2 in the first example.

Figure 15:
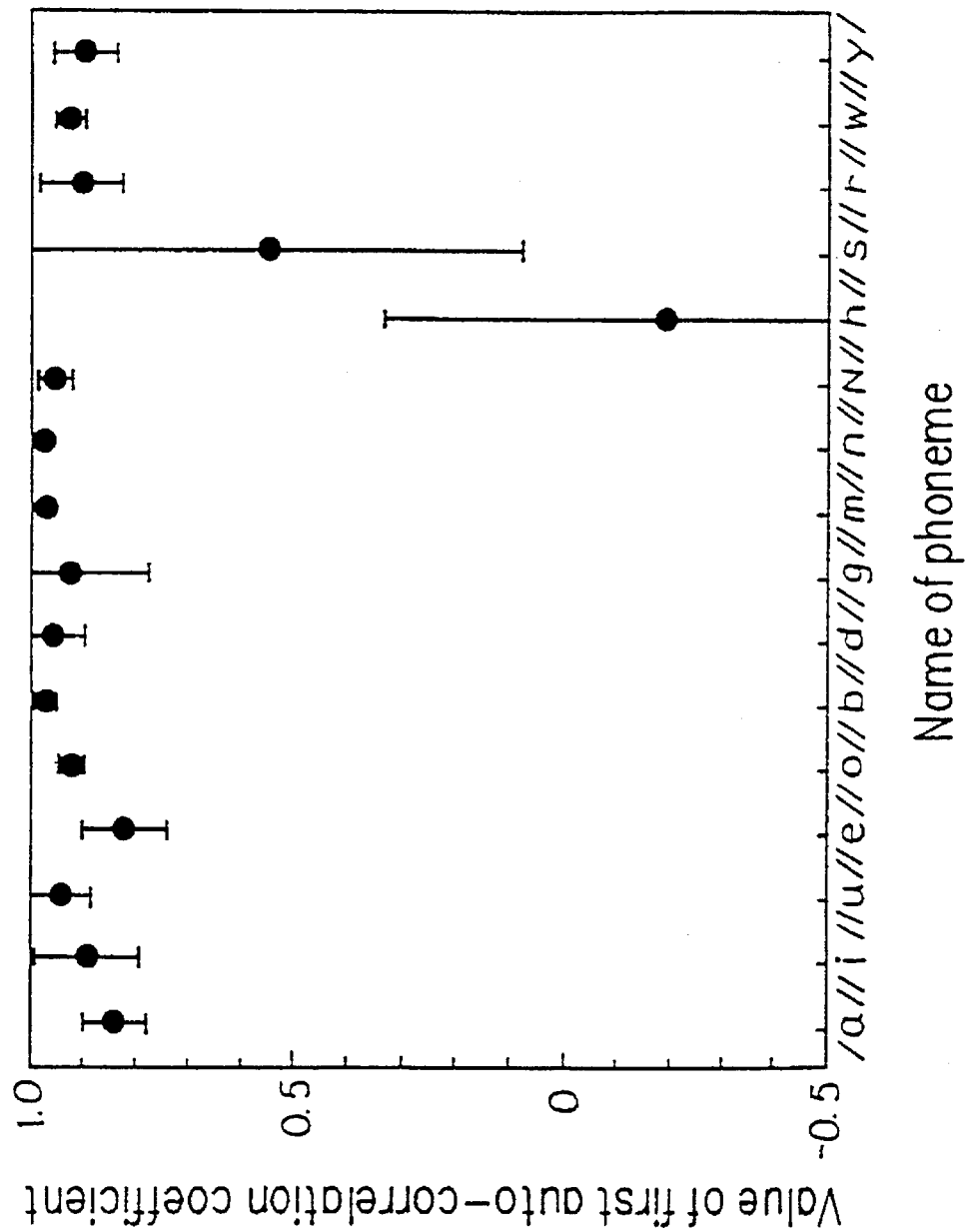
FIG. 15 is a diagram showing the occurrence frequency distribution of the value of the first auto-correlation coefficient for 16 phonemes obtained from training data.
Figure 16:
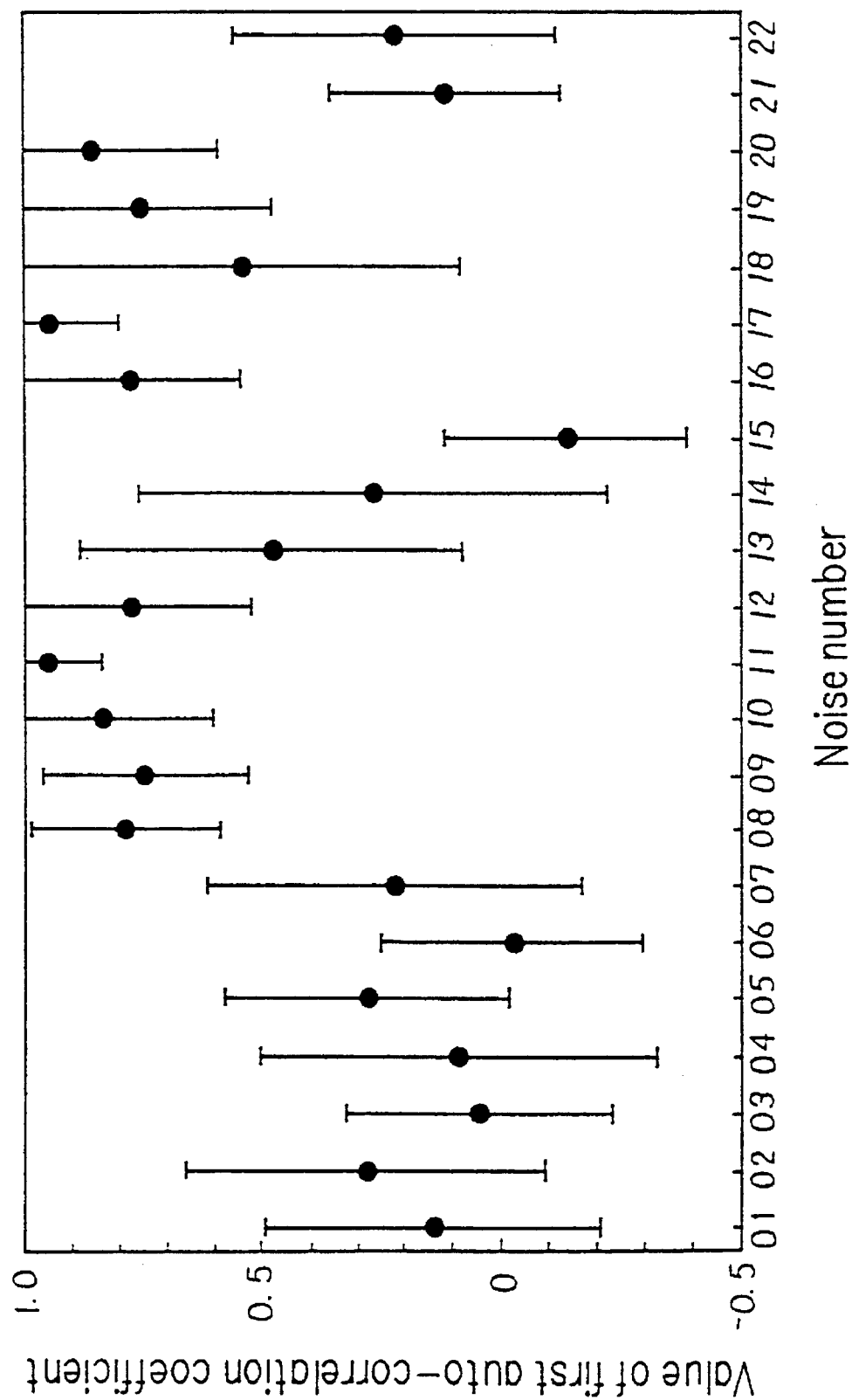
FIG. 16 is a diagram showing the occurrence frequency distribution of the value of the first auto-correlation coefficient for 2 noises obtained from training data.
Figure 17:
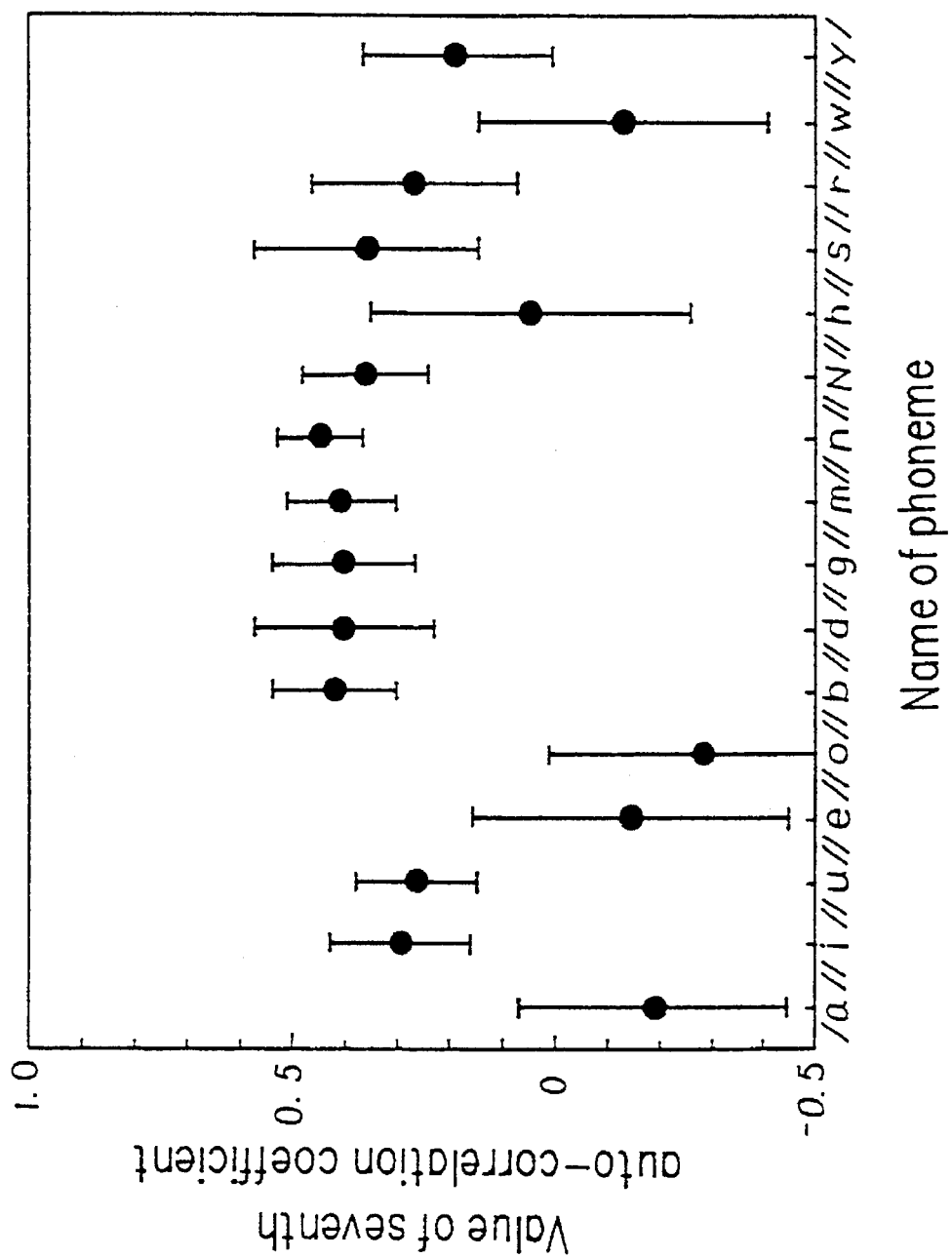
FIG. 17 is a diagram showing the occurrence frequency distribution of the value of the seventh auto-correlation coefficient for 16 phonemes obtained from training data.
Figure 18:
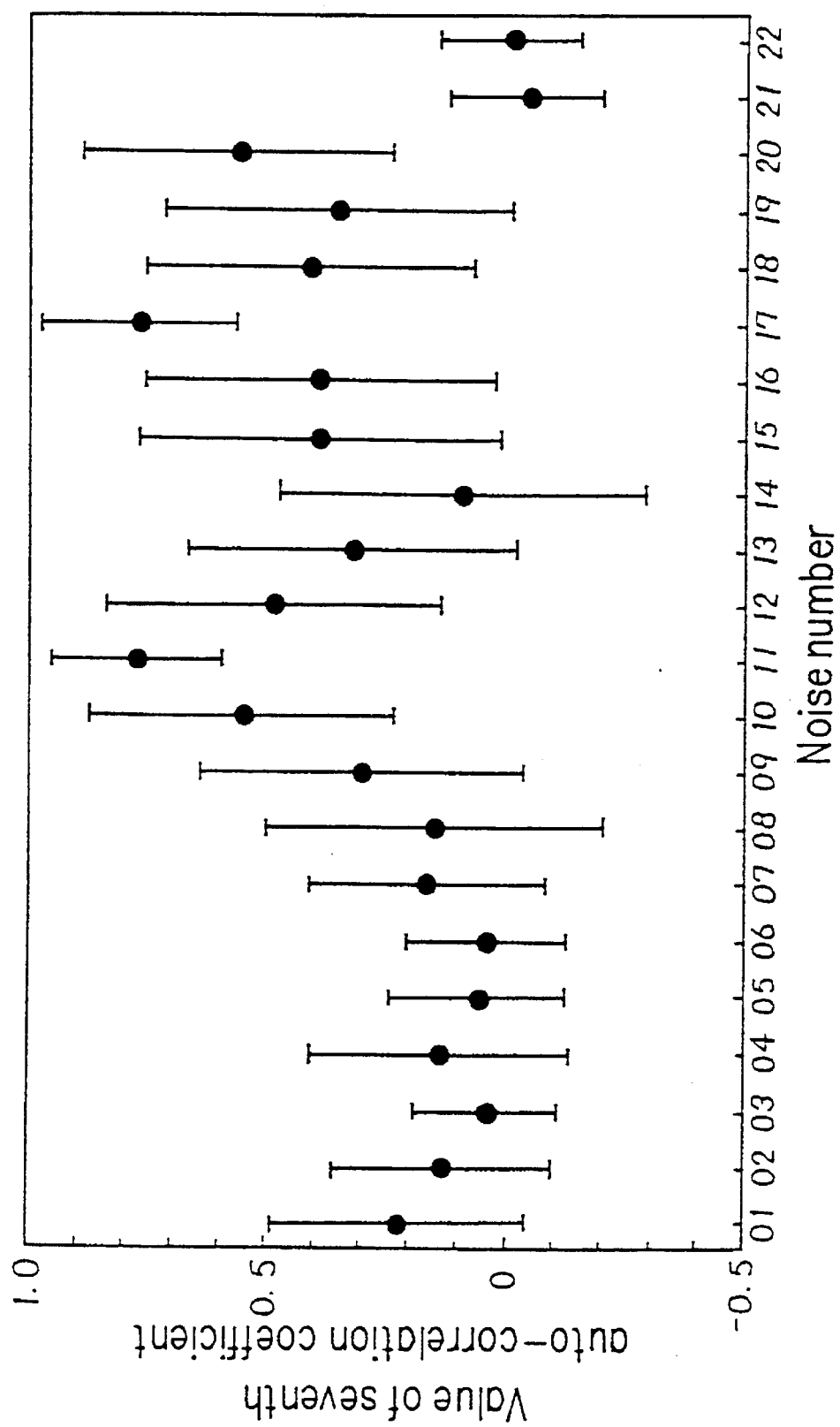
FIG. 18 is a diagram showing the occurrence frequency distribution of the value of the seventh auto-correlation coefficient for 22 noises obtained from training data.
Figure 19:
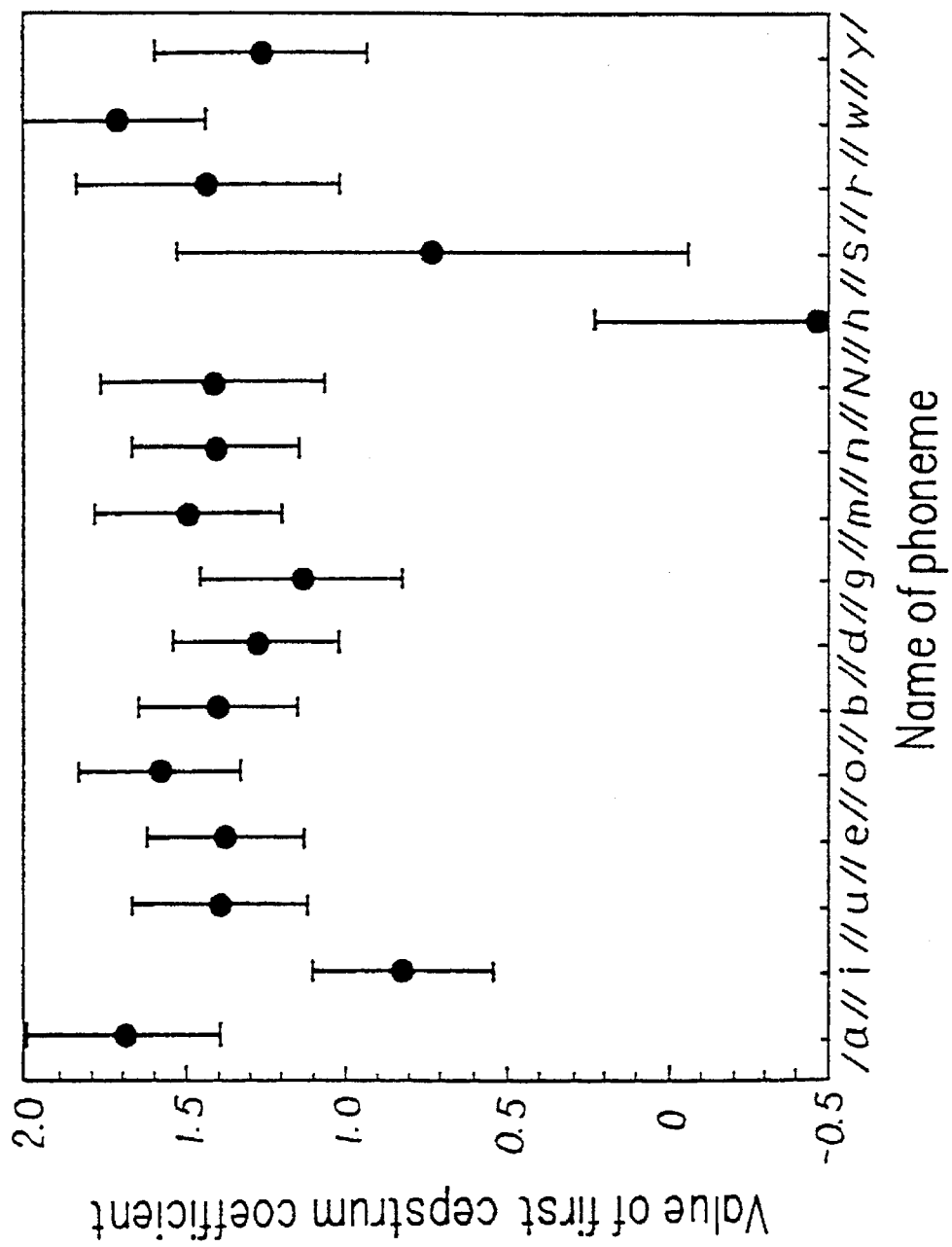
FIG. 19 is a diagram showing the occurrence frequency distribution of the value of the first cepstrum coefficient for 16 phonemes obtained from training data.
Figure 20:
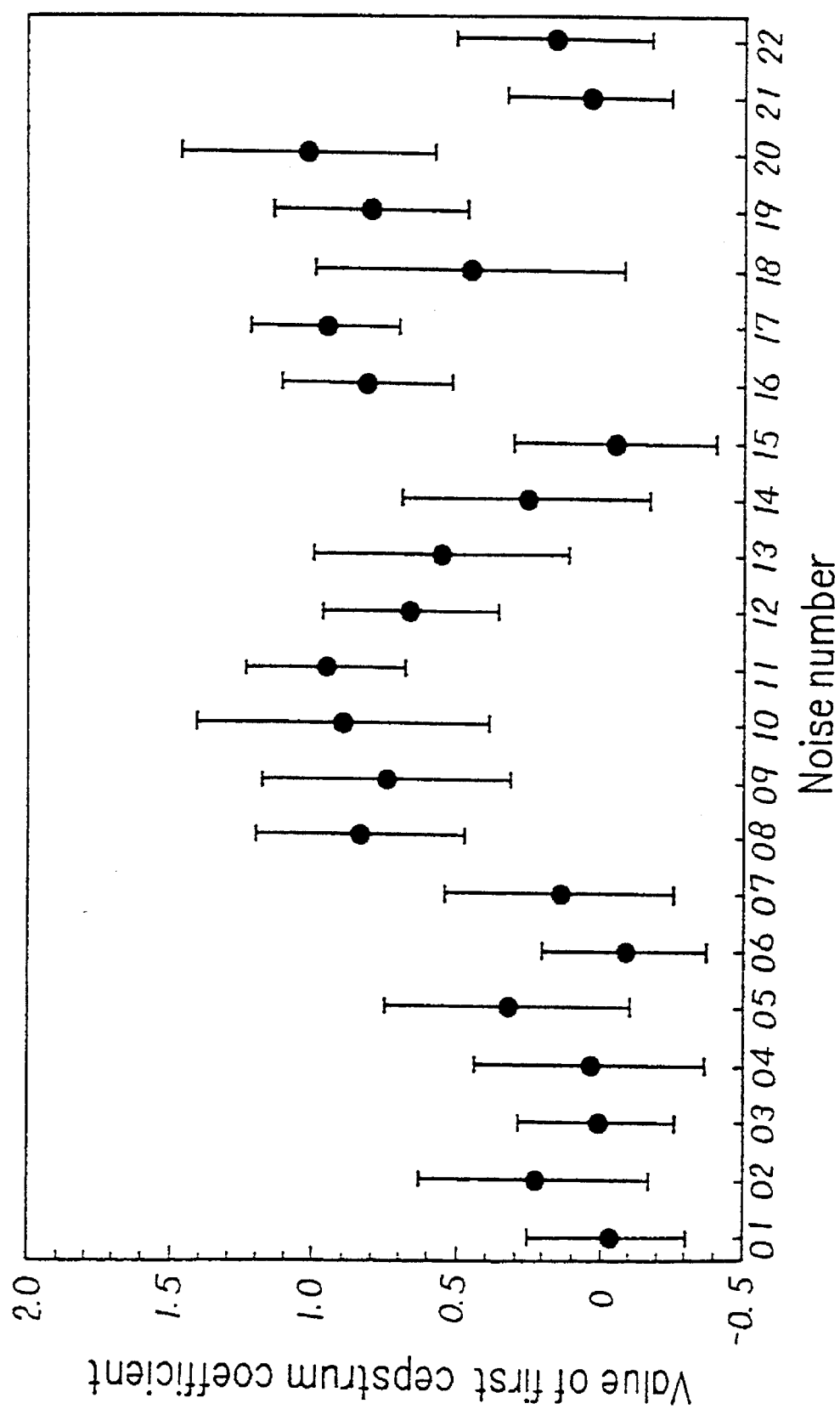
FIG. 20 is a diagram showing the occurrence frequency distribution of the value of the first cepstrum coefficient for 22 noises obtained from training data.
Figure 21:
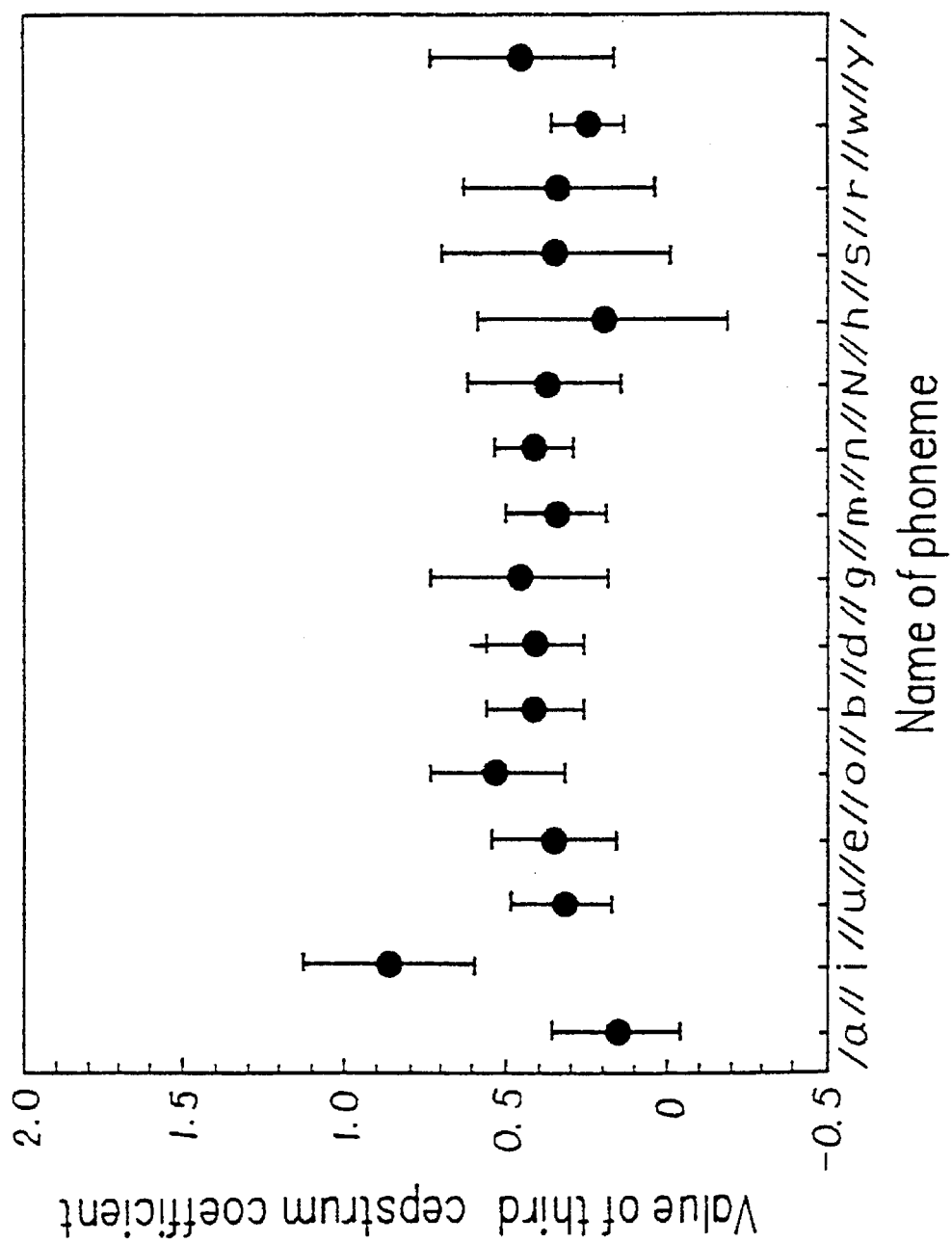
FIG. 21 is a diagram showing the occurrence frequency distribution of the value of the third cepstrum coefficient for 16 phonemes obtained from training data.
Figure 22:
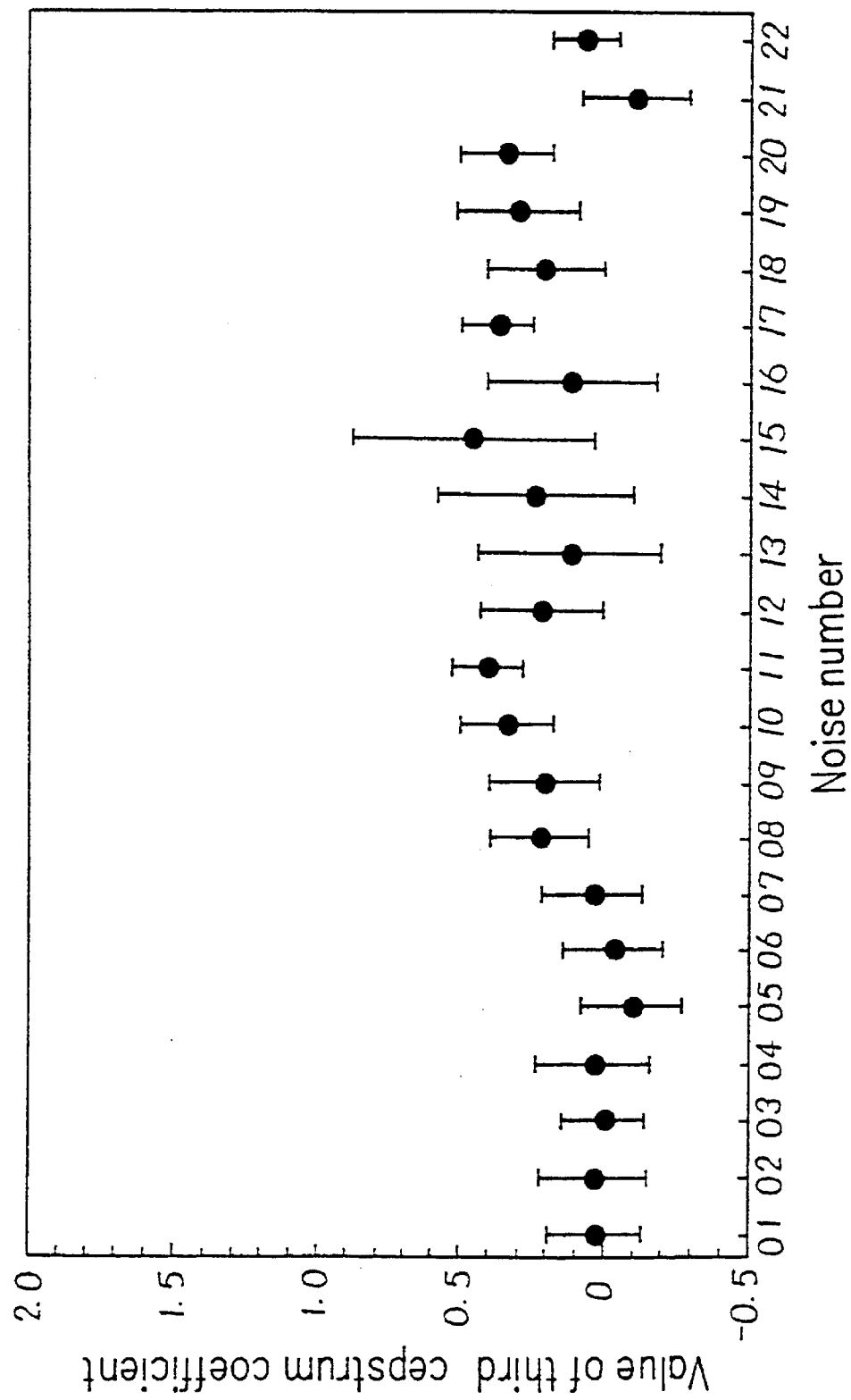
FIG. 22 is a diagram showing the occurrence frequency distribution of the value of the third cepstrum coefficient for 22 noises obtained from training data.

The examined results are shown in FIGS. 15–22. FIGS. 15 and 16 show the occurrence frequency distribution of a value of first auto-correlation coefficient for 16 phonemes and 22 noises. FIGS. 17 and 18 show the occurrence frequency distribution of a value of seventh auto-correlation coefficient for 16 phonemes and 22 noises. FIGS. 19 and 20 show the occurrence frequency distribution of a value of first cepstrum coefficient for 16 phonemes and 22 noises. FIGS. 21 and 22 show the occurrence frequency distribution of a value of third cepstrum coefficient for 16 phonemes and 22 noises.

In these figures, the solid circle indicates a mean value, and a line extending in a vertical direction indicates the standard deviation. From these results, it is found that the respective parameters have the following tendency.

The auto-correlation coefficients are parameters reflecting the difference of frequency bands on which the energy is concentrated. The first autocorrelation coefficient indicates a value closer to 0 for a signal in which the energy dominantly exists in a high-frequency band (e.g., an unvoiced sound, and noise with high randomness), and indicate a value closer to 1 for a signal in which the energy dominantly exists in a certain frequency band (e.g., a voiced sound) (see FIGS. 15 and 16). The seventh auto-correlation coefficient indicates a value closer to 1 for a signal in which the energy dominantly exists in a relatively low frequency band (e.g., a stationary noise), and indicate a value closer to 0 for a signal in which the energy dominantly exists in a certain frequency band (e.g., a voiced sound) (see FIGS. 17 and 18).

The cepstrum coefficients are parameters indicating the shape of spectrum of a speech signal. For the same voiced sound, the values of the cepstrum coefficients are largely different from each other depending on the phonemes. The first cepstrum coefficient is a parameter indicating a general difference of spectrum such as whether the phoneme is a voiced sound or an unvoiced sound. The first cepstrum coefficient has a value of 1.0 or more for the voiced sound excluding the phoneme /i/, and has a value of 1.0 or less for the other phonemes (see FIGS. 19 and 20). The third cepstrum coefficient particularly represents the feature of the phoneme /i/. The third cepstrum coefficient has a value of 0.5 or more for the phoneme /i/, and has a value of 0.5 or less for the other phonemes (see FIGS. 21 and 22).

From the above, it is found that the phoneme /i/ has a tendency which is different from the other four of five vowels, so that the phoneme /i/ may be erroneously judged by the criteria of parameters used for detecting vowels in many cases. In order to avoid such erroneous judgment, and to perform the speech detection more accurately, it is necessary to provide a judgment criterion (parameter judgment threshold value) depending on the inherent tendency of phoneme.

Hereinafter, the speech detection method by the speech detection apparatus 40 will be described in more detail.

The input audio signal through a microphone (not shown) is applied to the parameter extractor 41. The parameter extractor 41 extracts a plurality of parameters required for the speech detection as in the above-described examples. In this example, the following five parameters are extracted by the parameter extractor 41: a power value $P_i$ for each frame; a normalized first auto-correlation coefficient $Ai(1)$; a normalized seventh auto-correlation coefficient $Ai(7)$; a first cepstrum coefficient $Ci(1)$; and a third cepstrum coefficient $Ci(3)$.

Instead of the first auto-correlation coefficient, another low order (fifth or lower orders) autocorrelation coefficient can be used. These low order auto-correlation coefficients indicate the same tendency required for distinguishing a nonspeech sound in which the energy dominantly exists in a low frequency band.

Alternatively, a first PARCOR coefficient can be used instead of the first auto-correlation coefficient, and a first LPC coefficient can be used instead of the first cepstrum coefficient (because the absolute values thereof are equal to each other).

In this example, together with the first cepstrum coefficient, a third cepstrum coefficient which is a parameter particularly indicating the feature of the phoneme /i/ is used. In order to realize the speech/nonspeech judgment with high performance, first or higher order cepstrum coefficients which particularly represent other phonemes such as /a/, /u/, /e/, and /o/ can be additionally used. If LPC cepstrum coefficients, FFT cepstrum coefficients, and melcepstrum coefficients are used as the cepstrum coefficients, there occurs no problem in terms of the fact that the phoneme property can be judged in more detail based on the features of respective phonemes in the speech.

The threshold value decision unit 42 extracts parameters to be used in the parameter extractor 41 from extensive training data (for a vowel part) and nonspeech data (noise data). Then, based on the distribution of these parameters, threshold values required for speech/nonspeech judgment are determined, for each parameter. Furthermore, another threshold value for each parameter is determined for judging how many frames which satisfy a threshold condition (to be detected as speech) should appear within a specific period (the number of frames). Namely, the existence ratio of the frames detected as speech within a specific period (speech candidate period) is extracted from the training data for each parameter. A threshold value of the existence ratio is determined for the speech/nonspeech judgment.

The nonspeech data for determining the speech/nonspeech threshold value can be selected in accordance with the situation in which the speech detection apparatus is used.

For example, in the case of using the speech detection apparatus in a meeting room, it suffices to use data of noises which are expected to actually occur, such as taps on a table, rustling of paper sheets, clicking of glass, etc.

The parameters extracted from the input audio signal by the parameter extractor 41 are input to each of the general decision unit 43 and the detailed decision unit 44. The first and seventh auto-correlation coefficients and the first cepstrum coefficient are input to the general decision unit 43, and the third cepstrum coefficient is input to the detailed decision unit 44.

Figure 23:
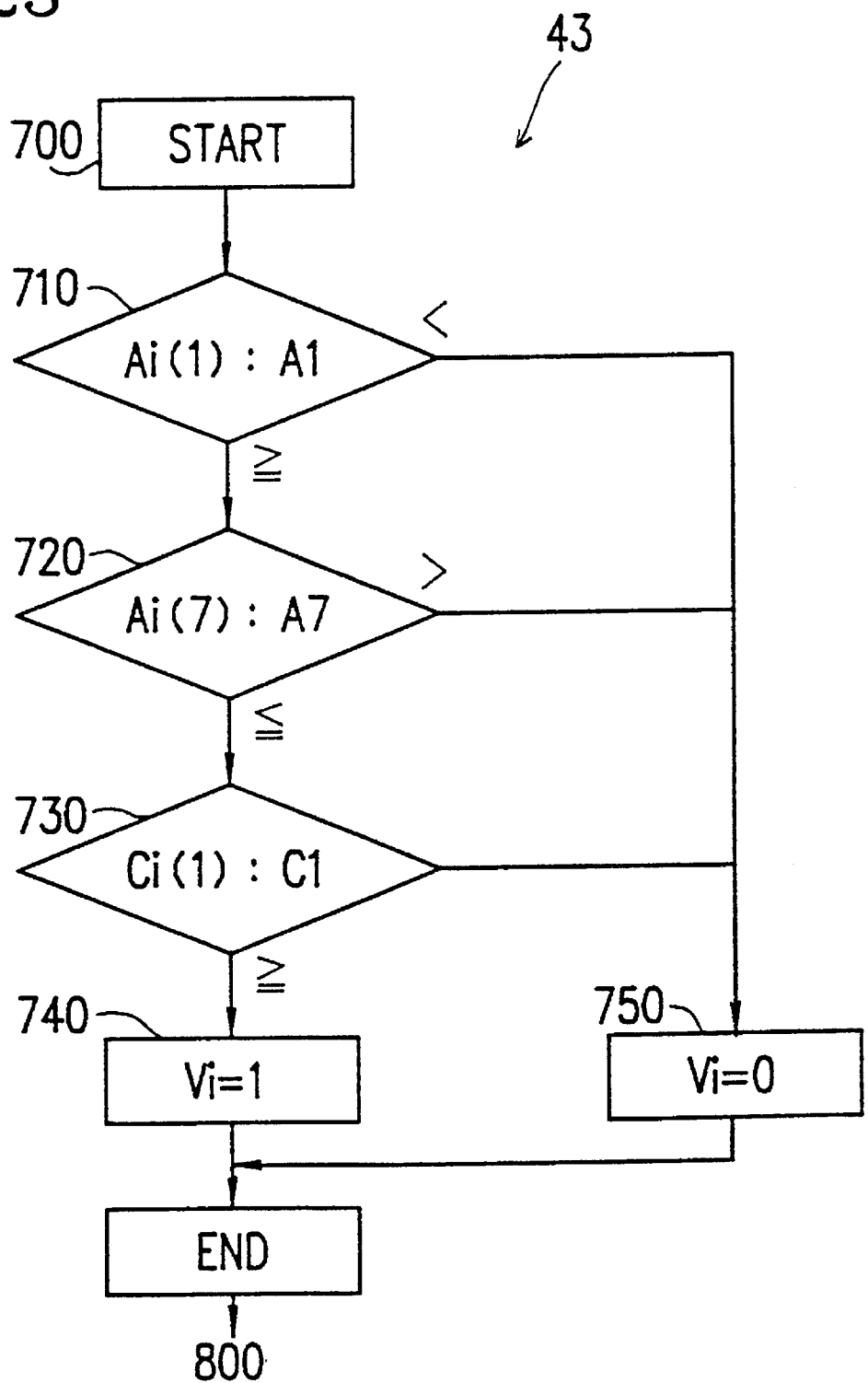
FIG. 23 is a flowchart schematically showing the decision procedure in a general decision unit.

FIG. 23 schematically shows a decision procedure in the general decision unit 43.

First, random noises such as unvoiced sounds having energy dominant in a high frequency band are excluded from the candidate of the speech detection by using the value of the first auto-correlation coefficient. The first auto-correlation coefficient $Ai(1)$ of the frame i of the input audio signal is extracted, and compared with the threshold value $A1$ of the first autocorrelation coefficient which is determined in the threshold value decision unit 42. If $Ai(1) \geq A1$, the input signal is judged to be speech, and otherwise, it is judged to be nonspeech (step 710).

Then, noises having energy dominant in a low frequency band are excluded from the candidate of the speech detection, by using the value of the seventh auto-correlation coefficient. The seventh auto-correlation coefficient $Ai(7)$ of the frame i of the input audio signal is extracted, and compared with the threshold value $A7$ of the seventh auto-correlation coefficient which is determined in the threshold value decision unit 42. If $Ai(7) \leq A7$, the input signal is judged to be speech, and otherwise, it is judged to be nonspeech (step 720).

And then, voiced sounds excluding the phoneme /i/ are detected by using the value of the first cepstrum coefficient. The first cepstrum coefficient $Ci(1)$ of the frame i of the input audio signal is extracted, and compared with the threshold value $C1$ of the first cepstrum coefficient which is determined in the threshold value decision unit 42. If $C1(1) \geq C1$, the input signal is judged to be speech, and otherwise, it is judged to be nonspeech (step 730). If the judged result at the step 730 is "speech", Vi=1 is output at a step 740. If "nonspeech", Vi=0 is output at a step 750. The output value Vi is a value which indicates the judged results (speech: 1, nonspeech: 0). These output values are applied to the detailed decision unit 44.

Figure 24:
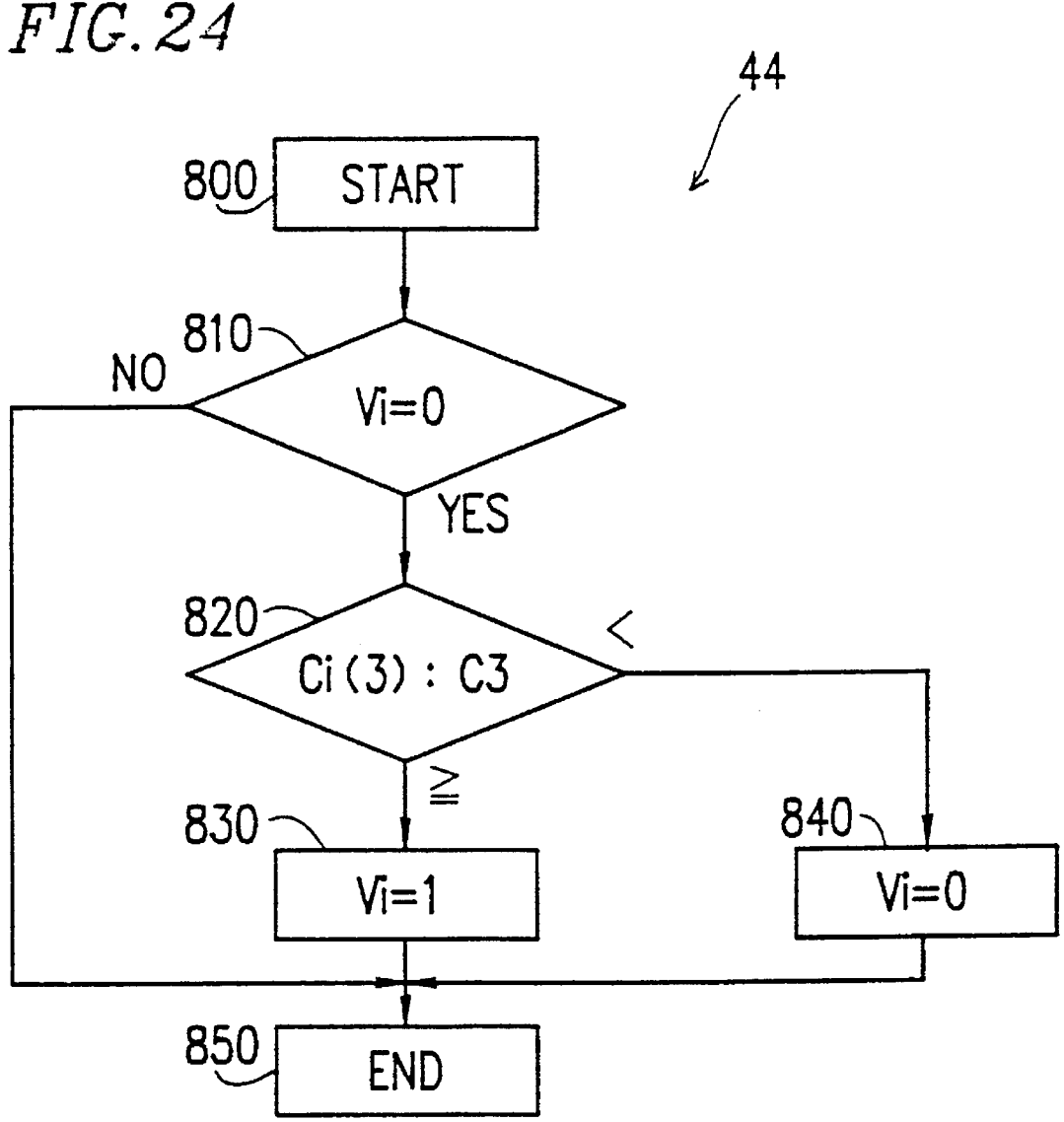
FIG. 24 is a flowchart schematically showing the decision procedure in a detailed decision unit.

FIG. 24 schematically shows a decision procedure in the detailed decision unit 44.

The detailed decision unit 44 applies the output value Vi directly to the final decision unit 45 (step 810→850), in the case of a signal judged to be speech in the general decision unit 43 (i.e., Vi=1). When a signal is judged to be nonspeech in the general decision unit 43 (i.e., Vi=0), the decision whether it is the phoneme /i/ or not is performed. The value of the third cepstrum coefficient $Ci(3)$ extracted from the input audio signal is compared with the threshold value $C3$ of the third cepstrum coefficient which is determined in the threshold value decision unit 42. If $Ci(3) \geq C3$, the signal is judged to be the phoneme /i/ (i.e., speech), and otherwise, it is judged to be nonspeech (step 820).

If the judged result at step 820 is "speech", Vi=1 is output at step 830. In the case of "nonspeech", Vi=0 is output at step 840. This output value Vi is applied to the final decision unit 45.

The final decision unit 45 makes a final decision as to whether the specific period of the input signal is a speech signal or not, based on the judged result applied from the detailed decision unit 44 and the power value applied from the parameter extractor 41. The final decision unit 45 compares the power value Pi obtained in the power calculator 41a with the power threshold value $P_{TH}$ determined in the threshold value decision unit 42. The final decision unit 45 decides a speech candidate period by detecting the number of successive frames having a power equal to or more than the threshold value $P_{TH}$ and comparing the detected number of the successive frames with a predetermined value. When the detected number is equal to or larger than the predetermined value, the specific period is judged to be the speech candidate period.

If the ratio of the number Cv of frames judged as speech by the General decision unit 43 and the detailed decision unit 44 to the number J of frames detected as the speech candidate period is equal to or larger than the threshold value M which is predetermined in the threshold value decision unit 42, i.e., if the below-mentioned Inequality (22) is satisfied, the speech candidate period is judged to be speech.

$$\frac{Cv}{J} \times 100 \geq M \qquad (22)$$

More practically, as to the frames having powers Pi equal to or Greater than the threshold value $P_{TH}$, the phonemic detection is performed, while counting the number Cv of the frames judged to be speech. If the power value $P_i$ is equal to or larger than the threshold value $P_{TH}$, these steps are repeated. When the power value $P_i$ becomes smaller than the threshold value $P_{TH}$, the number of repetitions (i.e., the number of successive frames) is determined. The repeated number Cv is compared with the threshold value M which is predetermined in the threshold value decision unit 42. If Cv satisfies the above-mentioned Inequality (22), the speech candidate period is judged to be speech. Moreover, in the above-mentioned decision procedure, a predetermined upper threshold $M_{max}$ may be provided as expressed by Inequality (23), so as to prevent a noise which continues for a long time with a large power from being erroneously judged as speech.

$$M_{max} > \frac{Cv}{J} \times 100 \geq M \qquad (23)$$

As described above, the speech detection apparatus in this example performs the judgment based on the phoneme property of speech. In this way, it is possible to provide a speech detection apparatus which can accurately detect a speech signal from various audio signals with a relatively simple construction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for speech detection comprising:
   reference model making means for extracting a plurality of parameters for a speech detection from training data, and making a reference model based on parameters;
   parameter extracting means for extracting the plurality of parameters from each frame of an input audio signal; and
   decision means for deciding whether audio signal is speech or not, by comparing the parameters extracted from the input audio signal will the reference model, wherein
   the reference model making means makes a respective reference model for each phoneme, and
   the decision means comprises:
      similarity computing means for comparing the parameters extracted from each frame of the input audio signal with the reference model, and computing a similarity of the frame with respect of the reference model;
      phoneme decision means for deciding a respective phoneme for each frame of the input audio signal based on the similarity computed for each phoneme; and
      final decision means for deciding whether a specific period of the input audio signal including a plurality of frames is speech or not based on the result of the phoneme decision for the plurality of frames.

2. An apparatus according to claim 1, wherein the reference model making means makes a reference pattern by calculating a mean value and a covariance matrix of the plurality of parameters for each phoneme.

3. An apparatus according to claim 1, wherein the plurality of parameters are selected from the group consisting of the first and higher order auto-correlation coefficients, the first and higher order PARCOR coefficients, the first and higher order melcepstrum coefficients, and the first and higher order LSP coefficients.

4. An apparatus according to claim 1, wherein the parameter extracting means comprises auto-correlation coefficient calculator means for deriving auto-correlation coefficients of a plurality of orders and a cepstrum coefficient calculator means for deriving cepstrum coefficients of a plurality of orders.

5. An apparatus according to claim 4, wherein the auto-correlation coefficient calculator means calculates the first and seventh auto-correlation coefficients, and the cepstrum coefficient calculator means calculates the first and third cepstrum coefficients.

6. An apparatus according to claim 1, wherein the similarity is a statistical distance between the parameters extracted from the input audio signal and interdigital transducer the reference model.

7. An apparatus according to claim 6, wherein the statistical distance is log likelihood.

8. An apparatus according to claim 1, wherein the phoneme decision means computes averaged likelihood by averaging the log likelihood of each frame computed by the likelihood computing means with respect to a plurality of successive frames including a target frame for phoneme detection, and detect a phoneme based on the averaged likelihood.

9. An apparatus according to claim 1, wherein the parameter extracting means further comprises a power calculating means for computing a power for each frame, and wherein the specific period of the audio signal is a period having a power equal to or greater than a predetermined value.

10. An apparatus according to claim 1, wherein the phoneme is a vowel, and wherein the final decision means comprising:
   counting means for counting the number of frames detected to be a vowel by the phoneme decision means in the specific period,
   computing means for computing the ratio of the number counted by the counting means to the number of the total frames included in the specific period, and
   judging means for deciding whether the specific period of the input signal is speech or not based on the ratio computed by the computing means.

11. An apparatus according to claim 1, wherein the phoneme is a consonant, and wherein the final decision means comprising:

counting means for counting the number of frames detected to be a consonant by the phoneme decision means in the specific period, computing means for computing the ratio of the number counted by the counting means to the number of the total frames included in the specific period, and judging means for deciding whether the specific period of the input signal is speech or not based on the ratio computed by the computing means.

12. An apparatus according to claim 1, wherein the final decision means comprises:

classification means for classifying the phonemes decided by the phoneme decision means into first and second phoneme groups;

counting means for counting a first number of frames classified into the first phoneme group and a second number of frames classified into the second phoneme group in the specific period of the input audio signal;

computing means for computing a first ratio of the first number with respect to the number of frames included in the specific period and a second ratio of the second number with respect to the number of frames included in the specific period; and judging means for judging whether the specific period is speech or not using fuzzy reasoning based on the first ratio and the second ratio.

13. An apparatus for speech detection comprising:

reference model making means for extracting a plurality of parameters for a speech detection for training data, and making a respective reference model for each phoneme based on parameters;

parameter extracting means for extracting the plurality of parameters from each frame of an input audio signal; and decision means for deciding whether the input audio signal is speech or not, by comparing the parameters extracted from the input audio signal with the reference model, wherein the reference model making means comprises: parameter distribution making means for making a respective statistical distribution of the parameters for each phoneme; and a duration distribution making means for making a respective statistical distribution of a duration of the phoneme for each phoneme, and wherein the decision means comprises:

first likelihood computing means for calculating parameter likelihood for each frame by comparing the parameters extracted from the frame of the input audio signal with the parameter distribution;

second likelihood computing means for deciding a phoneme candidate for each frame of the input audio signal based on the parameter likelihood of each frame, comparing a duration of the phoneme candidate with the duration distribution, and calculating duration likelihood for each frame; and comprehensive decision means for identifying one phoneme from the phoneme candidates based on the parameter likelihood and the duration likelihood, and for deciding whether a specific period containing a plurality of frames of the input audio signal is speech or not, based on the result of the phoneme identification for the plurality of frames.

14. An apparatus according to claim 13, wherein the parameter distribution making means makes a reference pattern by calculating a mean value and a covariance matrix of the plurality of parameters for each phoneme, and the duration distribution making means makes a reference pattern by calculating a mean value and a covariance of the duration for each phoneme.

15. An apparatus according to claim 13, wherein the plurality of parameters are selected from the group consisting of the first and higher order auto-correlation coefficients, the first and higher order LPC coefficients, the first and higher order PARCOR coefficients, the first and higher order cepstrum coefficients, the first and higher order melcepstrum coefficients and the first and higher order LSP coefficients.

16. An apparatus according to claim 13, wherein the parameter extracting means has an auto-correlation coefficient calculator means for extracting auto-correlation coefficients of a plurality of orders, and a cepstrum coefficient calculator means for extracting cepstrum coefficients of a plurality of orders.

17. An apparatus according to claim 16, wherein the auto-correlation coefficient calculator means calculates the first and seventh auto-correlation coefficients, and the cepstrum coefficient calculator means calculates the first and third cepstrum coefficients.

18. An apparatus according to claim 13, wherein each of the parameter likelihood and the duration likelihood is log likelihood.

19. An apparatus according to claim 13, wherein the second likelihood computing means calculates averaged likelihood by averaging the parameter likelihood for each frame with respect to a plurality of successive frames including a target frame for phoneme detection, and detects a phoneme candidate based on the averaged likelihood.

20. An apparatus according to claim 13, wherein the parameter extracting means further comprises a power calculating means for computing a power for each frame, and wherein the specific period of the audio signal is a period having a power greater than a predetermined value.

21. An apparatus according to claim 13, wherein the comprehensive decision means comprises:

calculating means for calculating synthetic likelihood based on the parameter likelihood and the duration likelihood;

identification means for identifying one phoneme from the phoneme candidates based on the synthetic likelihood;

counting means for counting a number of frames identified to be a phoneme in the specific period of the input audio signal;

calculating means for calculating a ratio of the counted number of the frames with respect to the number of total frames included in the specific period of the input audio signal; and judging means for deciding whether the specific period of the input audio signal is speech or not base on the calculated ratio.

22. An apparatus according to claim 13, wherein the comprehensive decision means further comprises:

classification means for classifying the identified phoneme frames into first and second phoneme groups;

counting means for counting a first number of frames classified into the first phoneme group and a second number of frames classified into the second phoneme group in the specific period of the input audio signal;

computing means for computing a first ratio of the first number with respect to the number of frames included in the specific period and a second ratio of the second number with respect to the number of frames included in the specific period; and judging means for judging whether the specific period is speech or not using fuzzy reasoning based on the first ratio and the second ratio.

23. An apparatus for speech detection comprising:

reference model making means for extracting a plurality of parameters for a speech detection from training data, and making a reference model based on the parameters;

parameter extracting means for extracting the plurality of parameters from each frame of an input audio signal; and decision means for deciding whether the input audio signal is speech or not, by comparing the parameters extracted from the input audio signal with the reference model, wherein the reference model has a predetermined threshold value of each parameter for each phoneme, and the decision means comprises:
first decision means for deciding whether a frame of the input audio signal is speech or not by comparing the parameters extracted from the frame with the respective threshold values of the reference model;
second decision means for deciding whether the frame which has been decided to be nonspeech by the first decision means is speech or not, by comparing at least one parameter of the frame with the respective threshold value of the reference model; and
final decision means for deciding whether the specific period of the input audio signal is speech or not based on the ratio of the number of frames which are decided to be speech by the first or second decision means in the specific period with respect to the total number of frames in the specific period.

24. An apparatus according to claim 23, wherein the plurality of parameters are selected from the group consisting of the first and higher order auto-correlation coefficients, the first and higher order LPC coefficients, the first and higher order PARCOR coefficients, the first and higher order cepstrum coefficients, the first and higher order melcepstrum coefficients, and the first and higher order LSP coefficients.

25. An apparatus according to claim 23, wherein the parameter extracting means comprises an auto-correlation coefficient calculator means for extracting auto-correlation coefficients of plurality of orders, and a cepstrum coefficient calculator means for extracting cepstrum coefficients of plurality of orders.

26. An apparatus according to claim 25, wherein the auto-correlation coefficient calculator means calculates the first and seventh auto-correlation coefficients, and the cepstrum coefficient calculator means calculates the first and third cepstrum coefficients.

27. An apparatus according to claim 26, wherein the first decision means uses the first and seventh auto-correlation coefficients and the first cepstrum coefficient for comparing, and the second decision means uses the third cepstrum coefficient for comparing.

28. An apparatus according to claim 23, wherein the parameter extracting means further comprises a power calculator means for computing a power for each frame, and the specific period of the audio signal is a period having a power greater than a predetermined value.

29. A method for speech detection comprising the steps of:

(a) extracting a plurality of parameters for a speech detection from training data and making a reference model based on the parameters, (b) extracting the plurality of parameters from each frame of an input audio signal, (c) deciding whether the input audio signal is speech or not, by comparing the parameters extracted from the input audio signal with the reference model, wherein steps (a) and (b) are preformed for each phoneme, respectively, and step (c) comprises the steps of:
(d) comparing the parameters extracted from each frame of the input audio signal with the reference model and computing a similarity of each frame with respect to the reference model,
(e) deciding a phoneme of each frame of the input audio signal based on the similarity computed for each phoneme, and
(f) deciding whether a specific period of the input audio signal including a plurality of frames is speech or not based on the result of the phoneme decision in step (e).

30. A method according to claim 29, wherein step (a) comprises the step of making a reference pattern by calculating a mean value and a covariance matrix of the plurality of parameters.

31. A method according to claim 29, wherein the parameters used in the steps are selected from the group consisting of the first and higher order auto-correlation coefficients, the first and higher order PARCOR coefficients, the first and higher order melcepstrum coefficients, and the first and higher order LSP coefficients.

32. A method according to claim 29, wherein step (b) comprises the steps of deriving auto-correlation coefficients of a plurality of orders and deriving cepstrum coefficients of a plurality of orders.

33. A method according to claim 32, wherein in step (b), the first and seventh auto-correlation coefficients and the first and third cepstrum coefficients are derived.

34. A method according to claim 29, wherein in step (d), the similarity is a statistical distance between the parameters extracted from the input audio signal and the reference model.

35. A method according to claim 34, wherein the statistical distance is log likelihood.

36. A method according to claim 29, wherein step (e) comprises the steps of computing an averaged likelihood by averaging the log likelihood of each frame computed in step (d) with respect to a plurality of successive frames including a target frame for phoneme detection, and detecting a phoneme based on the averaged likelihood.

37. A method according to claim 29, wherein step (b) comprises the step of computing a power for each frame, and wherein step (f) comprises the steps of:
comparing the power of each frame with a predetermined value, and
identifying a period of the input audio signal based on the number of frames having the power equal to or higher than a predetermined value as the specific period of the input audio signal.

38. A method according to claim 29, wherein step (e) comprises the step of (e1) deciding a vowel of each frame of the input audio signal, and wherein step (f) comprises the steps of:

(f1) counting the number of frames detected to be a vowel in step (e1) in the specific period of the input audio signal, (f2) computing the ratio of the number counted in step (f1) to the number of the total frames included in the specific period of the input audio signal, and (f3) judging whether the specific period of the input signal is speech or not based on the ratio computed in step (f2).

39. A method according to claim 29, wherein step (e) comprises the step of (e1) deciding a consonant of each frame of the input audio signal, and wherein step (f) comprises the steps of:
- (f1) counting the number of frames detected to be a consonant in step (e1) in the specific period of the input audio signal,
- (f2) computing the ratio of the number counted in step (f1) to the number of the total frames included in the specific period of the input audio signal, and
- (f3) judging whether the specific period of the input signal is speech or not based on the ratio computed in step (f2).

40. A method according to claim 29, wherein step (f) comprises the steps of:
- (g) classifying the phonemes decided in step (e) into first and second phoneme groups,
- (h1) counting a first number of frames classified into the first phoneme group,
- (h2) counting a second number of frames classified into the second phoneme group in the specific period of the input audio signal,
- (i1) computing a first ratio of the first number with respect to the number of frames included in the specific period,
- (i2) computing a second ratio of the second number with respect to the number of frames included in the specific period, and
- (j) judging whether the specific period is speech or not using fuzzy reasoning based on the first ratio and the second ratio.

41. A speech detection method for speech/nonspeech judgement for an input audio signal using a plurality of parameters extracted from the input audion signal and a reference model based on training data, comprising the steps of:
- (a) extracting the plurality of parameters from the training data and making a respective statistical distribution of the parameters for each phoneme,
- (b) measuring a respective duration for each phoneme of the training data and making a respective statistical distribution for the duration of each phoneme,
- (c) extracting the plurality of parameter from each frame of an input audio signal,
- (d) calculating parameter likelihood for each frame by comparing the parameters extracted in step (c) with the parameter distribution,
- (e) deciding a phoneme candidate for each frame of the input audio signal based on the parameter likelihood of each frame,
- (f) comparing a duration of the phoneme candidate with the duration distribution and calculating duration likelihood for each frame,
- (g) identifying one phoneme from the phoneme candidates based on the parameter likelihood and the duration likelihood, and
- (h) judging whether a specific period containing a plurality of frames of the input audio signal is speech or not based on the identified phoneme.

42. A method according to claim 41, wherein step (a) comprises the step of making a parameter reference pattern by calculating a mean value and a covariance matrix of the plurality of parameters for each phoneme, and step (b) comprises the step of making a duration reference pattern by calculating a mean value and a covariance of the duration of each phoneme.

43. A method according to claim 41, wherein the plurality of parameters in the steps are selected from the group consisting of the first and higher order auto-correlation coefficients, the first and higher order LPC coefficients, the first and higher order PARCOR coefficients, the first and higher order cepstrum coefficients, the first and higher order melcepstrum coefficients and the first and higher order LSP coefficients.

44. A method according to claim 41, wherein step (c) comprises the steps of extracting auto-correlation coefficients of a plurality of orders, and extracting cepstrum coefficients of a plurality of orders.

45. A method according to claim 44, wherein in step (c), the first and seventh auto-correlation coefficients, and the first and third cepstrum coefficients are derived.

46. A method according to claim 41, wherein each of the parameter likelihood in step (d) and the duration likelihood in step (f) are log likelihoods.

47. A method according to claim 41, wherein step (e) comprises: the steps of calculating averaged likelihood by averaging the parameter likelihood of each frame with respect to a plurality of successive frames including a target frame for phoneme detection, and detecting the phoneme candidate based on the averaged likelihood.

48. A method according to claim 41, wherein step (c) further comprises the step of computing a power for each frame, and wherein step (h) comprises the steps of:
- comparing the power of each frame with a predetermined value,
- counting the number of frames which have a power equal to or higher than a predetermined value, and
- identifying a period of the input audio signal based on the number of frames having the power equal to or higher than a predetermined value as the specific period of the input audio signal.

49. A method according to claim 41, wherein step (g) comprises the steps of: calculating synthetic likelihood based on the parameter likelihood and the duration likelihood, and identifying one phoneme from the phoneme candidates based on the synthetic likelihood, and step (h) comprises the steps of:
- counting a number of frames identified to be a phoneme in step (g) in the specific period of the input audio signal,
- calculating a ratio of the counted number of the frames with respect to the number of total frames included in the specific period, and
- deciding whether the specific period of the input audio signal is speech or not base on the calculated ratio.

50. A method according to claim 41, wherein step (h) comprises the steps of:
- (i) classifying the identified phoneme frames into first and second phoneme groups,
- (j1) counting a first number of frames classified into the first phoneme group in the specific period of the input audio signal,
- (j2) counting a second number of frames classified into the second phoneme group in the specific period of the input audio signal,
- (k1) computing a first ratio of the first number with respect to the number of frames included in the specific period, (k2) computing a second ratio of the second number with respect to the number of frames included in the specific period, and (l) judging whether the specific period is speech or not using fuzzy reasoning based on the first ratio and the second ratio.

51. A speech detection method for speech/nonspeech judgment for an input audio signal using a plurality of parameters extracted from the input audio signal and a reference model based on training data comprising the steps of:

(a) extracting the plurality of parameters for a speech detection from the training data and determining a threshold value of each parameter for each phoneme, (b) extracting the plurality of parameters from each frame of the input audio signal, (c) deciding whether a frame of the input audio signal is speech or nonspeech by comparing the parameters extracted from the frame with the respective threshold values, (d) deciding whether the frame which has been decided to be nonspeech by step (c) is speech or not, by comparing at least one parameter of the frame with the respective threshold value of the reference model, (e) counting the number of frames which are decided to be speech in step (c) or (d) in a specific period of the input audio signal, (f) calculating a ratio of the counted number in step (e) with respect to the total number of frames included in the specific period, and (g) judging whether the specific period of the input audio signal is speech or not based on the ratio calculated in step (f).

52. A method according to claim 51, wherein the plurality of parameters used in the steps are selected from the group consisting of the first and higher order auto-correlation coefficients, the first and higher order LPC coefficients, the first and higher order PARCOR coefficients, the first and higher order cepstrum coefficients, the first and higher order melcepstrum coefficients, and the first and higher order LSP coefficients.

53. A method according to claim 51, wherein step (b) comprises the steps of extracting auto-correlation coefficients of a plurality of orders, and extracting cepstrum coefficients of a plurality of orders.

54. A method according to claim 53, wherein in step (b), the first and seventh auto-correlation coefficients, and the first and third cepstrum coefficients are derived.

55. A method according to claim 54, wherein first and seventh auto-correlation coefficients and the first cepstrum coefficient are used for comparing in step (c), and the third cepstrum coefficient is used for comparing in step (d).

56. A method according to claim 51, wherein step (b) further comprises the step of computing a power for each frame, and wherein step (g) comprises the steps of comparing the power of each frame with a predetermined value, counting the number of frames which have a power equal to or higher than a predetermined value, and identifying a period of the input audio signal based on the number of frames having the power equal to or higher than a predetermined value as the specific period of the input audio signal.

* * * * *

UNITED STATES PATENT AND TRADE MARK OFFICE
CERTIFICATE OF CORRECTION

PATENT NO.   : 5,611,019
DATED        : March 11, 1997
INVENTOR(S)  : NAKATOH et al.

It is certified that error appears in the above-identified patent and that said Letters Patent is hereby corrected as shown below:

Column 29, line 60, before the word "parameters;" insert the word --the--.

Column 29, line 66, the word "will" should be --with--.

Column 31, line 33, the second occurrence of the word "for" should be --from--.

Column 32, line 55, the word "base" should be --based--.

Column 34, line 6, the word "preformed" should be --performed--.

Column 35, line 36, the word "judgement" should be --judgment--.

Column 35, line 37, the word "audion" should be --audio--.

Column 36, line 53, the word "base" should be --based--.

Signed and Sealed this

Thirtieth Day of June, 1998

Attest:

BRUCE LEHMAN

Attesting Officer

*Commissioner of Patents and Trademarks*